United States Patent
Ocak et al.

(10) Patent No.: US 11,570,618 B2
(45) Date of Patent: Jan. 31, 2023

(54) BOOTSTRAPPING DEVICES ON A NETWORK

(71) Applicant: Telefonaktiebolaget LM Ericsson (publ), Stockholm (SE)

(72) Inventors: Mert Ocak, Helsinki (FI); Jaime Jiménez, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 142 days.

(21) Appl. No.: 16/972,888

(22) PCT Filed: Jun. 25, 2018

(86) PCT No.: PCT/EP2018/066883
§ 371 (c)(1),
(2) Date: Dec. 7, 2020

(87) PCT Pub. No.: WO2020/001728
PCT Pub. Date: Jan. 2, 2020

(65) Prior Publication Data
US 2021/0120406 A1    Apr. 22, 2021

(51) Int. Cl.
*H04W 12/04*     (2021.01)
*H04W 4/70*     (2018.01)
(Continued)

(52) U.S. Cl.
CPC ......... *H04W 12/04* (2013.01); *H04L 61/3025* (2013.01); *H04L 67/1036* (2013.01);
(Continued)

(58) Field of Classification Search
CPC ....... H04W 12/04; H04W 12/68; H04W 4/70; H04L 61/3025; H04L 2101/385
See application file for complete search history.

(56) References Cited

U.S. PATENT DOCUMENTS

| | | | |
|---|---|---|---|
| 10,185,829 B2 * | 1/2019 | Sasin | G06F 21/44 |
| 10,200,353 B2 * | 2/2019 | Seed | H04L 67/141 |

(Continued)

OTHER PUBLICATIONS

Lightweight Machine To Machine Technical Specification: Core; Candidate Version 1.1, Open Mobile Alliance; OMA-TS-LightweightM2M_Core-V1_1-20180612-C (this document has been split into two parts)—Jun. 12, 2018.

(Continued)

*Primary Examiner* — Elton Williams
(74) *Attorney, Agent, or Firm* — Baker Botts, LLP

(57) ABSTRACT

Methods for operating a device and for managing bootstrapping of devices are disclosed. The method (100) for operating a device comprises computing (102) a derivative of a secret shared between the device and a server entity of a network, generating (104) a temporary bootstrap URI by combining at least a part of the computed derivative with a static bootstrap URI for the network, and sending (106) a bootstrap request to the temporary bootstrap URI. The method for managing bootstrapping of devices comprises generating temporary bootstrap URIs corresponding to devices operable to connect to a network, and updating a network DNS registry to map the generated temporary bootstrap URIs to the IP address of at least one of a bootstrap server instance reachable via the network and/or a bootstrap load balancer. Also disclosed are a device, a bootstrap load balancer, a bootstrap server, and a computer program.

10 Claims, 14 Drawing Sheets

(51) Int. Cl.
*H04W 12/06* (2021.01)
*H04L 61/3015* (2022.01)
*H04L 67/1036* (2022.01)
*H04L 101/385* (2022.01)

(52) U.S. Cl.
CPC .......... *H04W 4/70* (2018.02); *H04W 12/068* (2021.01); *H04L 2101/385* (2022.05)

(56) References Cited

U.S. PATENT DOCUMENTS

| | | | |
|---|---|---|---|
| 10,305,862 B2* | 5/2019 | Bone | H04W 4/50 |
| 10,321,311 B2* | 6/2019 | Sasin | H04L 63/0823 |
| 2018/0152541 A1 | 5/2018 | Mathison et al. | |

OTHER PUBLICATIONS

Lightweight Machine To Machine Technical Specification: Transport Bindings, Candidate Version 1.1, Open Mobile Alliance; OMA-TS-LightweightM2M_Transport-V1_1-20180612_C—Jun. 12, 2018.

Lightweight Machine To Machine Technical Specification; Approved Version 1.0.2; Open Mobile Alliance; OMA-TS-LightweightM2M-V1_0_2-20180209-A—Feb. 9, 2018.

Naming Things With Hashes; Internet Engineering Task Force (IETF), Request for Comments: 6920; Category: Standards Track; ISSN: 2070-1721 by S. Farrell et al.—Apr. 2013.

PCT International Search Report issued for International application No. PCT/EP2018/066883—Mar. 21, 2019.

PCT Written Opinion of the International Searching Authority issued for International application No. PCT/EP2018/066883—Mar. 21, 2019.

* cited by examiner

BOOTSTRAPPING DEVICES ON A NETWORK

PRIORITY

This nonprovisional application is a U.S. National Stage Filing under 35 U.S.C. § 371 of International Patent Application Serial No. PCT/EP2018/066883 filed Jun. 25, 2018 and entitled "Bootstrapping Devices on a Network" which is hereby incorporated by reference in its entirety.

TECHNICAL FIELD

The present disclosure relates to a method for operating a device that is operable to connect to a network, and to methods for bootstrapping and for managing bootstrapping of devices operable to connect to a network. The present disclosure also relates to a device, to a bootstrap load balancer, a bootstrap server and to a computer program and a computer program product configured, when run on a computer to carry out methods performed in a device, a bootstrap load balancer and a bootstrap server.

BACKGROUND

The "Internet of Things" (IoT) refers to devices enabled for communication network connectivity, so that these devices may be remotely managed, and data collected or required by the devices may be exchanged between individual devices and between devices and application servers. Such devices, examples of which may include sensors and actuators, are often subject to severe limitations on processing power, storage capacity, energy supply, device complexity and/or network connectivity, imposed by their operating environment or situation, and may consequently be referred to as constrained devices. Constrained devices often connect to the core network via gateways using short range radio technologies. Information collected from the constrained devices may then be used to create value in cloud environments.

The constrained nature of IoT devices has prompted the design and implementation of new protocols and mechanisms. The Constrained Application Protocol (CoAP), as defined in RFC 7252, is one example of a protocol designed for IoT applications in constrained nodes and constrained networks. CoAP provides a request-response based RESTful communication architecture between constrained nodes or between constrained nodes and nodes on the Internet. CoAP can easily be integrated to the web and web services by translating CoAP messages to HTTP. One of the available extensions to CoAP is to enable CoAP clients to observe resources from CoAP servers such that a CoAP server may notify a CoAP client. This enables server-initiated communication in constrained networks using CoAP, which is an important asset for constrained environments.

The Open Mobile Alliance (OMA) Lightweight Device Management (DM) protocol, also known as the Lightweight Machine to Machine protocol (LWM2M), is a light and compact device management protocol that may be used for managing IoT devices and their resources. LWM2M is designed to run on top of CoAP, which either uses UDP or SMS bindings. LWM2M is therefore compatible with any constrained device which supports CoAP. LWM2M defines three components:

LWM2M Client: contains several LWM2M objects with resources. An LWM2M Server can execute commands on the resources to manage the client, including reading, deleting, or updating resources. LWM2M Clients are generally run in constrained devices.

LWM2M Server: manages LWM2M Clients by sending management commands to them.

LWM2M Bootstrap Server: is used to manage the initial configuration parameters of LWM2M Clients during bootstrapping of a device.

In order to maintain communication between the above discussed components, the following LWM2M interfaces are defined:

Bootstrapping: LWM2M Bootstrap Server sets the initial configuration on an LWM2M Client when the client device bootstraps.

Client Registration: LWM2M Client registers to one or more LWM2M Servers when bootstrapping is completed.

Device Management and Service Enablement: LWM2M Server can send management commands to LWM2M Clients to perform several management actions on LWM2M resources of the client. An access control object of the client determines the set of actions the server can perform.

Information Reporting: As a feature of the CoAP Observe-Notify mechanism, LWM2M Clients can initiate communication to an LWM2M Server and report information in the form of notifications.

A constrained device must be configured during bootstrap for a specific environment and/or domain before being deployed to use that domain's LWM2M Server. A new LWM2M server can be added to the access control list (ACL) of the device in several ways as set out in the OMA DM LWM2M standard. During bootstrapping, an LWM2M Bootstrap Server updates client security information with the assigned LWM2M Server address and credentials for the LWM2M client. In this manner, the assigned LWM2M Server is given management rights on the client.

Typically, an LWM2M Bootstrap Server is a single server endpoint to which all bootstrapping clients try to connect. This may for example be the bootstrap server of a manufacturer of constrained devices. The LWM2M Bootstrap Server thus represents a single point of failure, which is generally undesirable and can lead to problems in deployment. If a large number of constrained devices try to bootstrap at the same time, the bootstrap server can become overloaded, which may result in the bootstrap server being unavailable to clients. The bootstrap server is also susceptible to Denial of Service (DoS) attacks, during which server overload is deliberately produced by a third party.

Efforts to address the issue of bootstrap server overload are limited by the constraint that the LWM2M protocol allows for only one bootstrap server account on the LWM2M client. It is not therefore possible to include additional bootstrap servers on a device, which would allow for a "simple load balancing" arrangement, according to which a device could attempt to contact different bootstrap server addresses. Existing approaches are therefore limited to Cloud based deployments in which an LWM2M Bootstrap Server may use a load balancing system such as HAProxy. According to such systems, the LWM2M Bootstrap Server remains as the single point of access for connecting devices, and server load is divided in the cloud between bootstrap server instances using proxies.

SUMMARY

It is an aim of the present disclosure to provide a method, apparatus and computer readable medium which at least partially address one or more of the challenges discussed above.

According to a first aspect of the present disclosure, there is provided a method for operating a device that is operable to connect to a network, the device operable to run a Light Weight Machine to Machine (LWM2M) client and being provisioned with a security credential comprising a secret that is shared with an LWM2M server entity reachable via the network. The method is performed in the device and comprises computing a derivative of the secret, generating a temporary bootstrap Uniform Resource Identifier (URI) by combining at least a part of the computed derivative with a static bootstrap URI for the network, and sending a bootstrap request to the temporary bootstrap URI.

According to examples of the present disclosure, the LWM2M server entity reachable via the network may comprise an LWM2M Bootstrap Server or may comprise an LWM2M Server. According to examples of the present disclosure, combining the at least a part of the computed derivative with a static bootstrap URI for the network may comprise inserting the at least part of the computed derivative into the static bootstrap URI, wherein the at least a part of the computed derivative may be inserted at any point into the static bootstrap URI. According to examples of the present disclosure, the at least a part of the computed derivative may comprise a specific number of X characters of the derivative, such as the last X characters or the first X characters etc., where X may be any integer up to and including the total length of the derivative. The characters of the derivative may be numeric digits, alphanumeric characters etc.

According to examples of the present disclosure, an identification of the shared secret to be used, the static bootstrap URI, and instructions for how to combine the at least a part of the computed derivative into the static bootstrap URI, may be contained within an LWM2M security object on the device.

According to examples of the present disclosure, the device may be a constrained device. For the purposes of the present disclosure, a constrained device comprises a device which conforms to the definition set out in section 2.1 of RFC 7228 for "constrained node". According to the definition in RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity, and gas content, for example within a room or while goods are transported and stored, motion sensors for controlling light bulbs, sensors measuring light that can be used to control shutters, heart rate monitor and other sensors for personal health (continuous monitoring of blood pressure etc.) actuators and connected electronic door locks.

According to examples of the present disclosure, the method may further comprise receiving a bootstrap response and completing a bootstrapping procedure for the network by sending bootstrap messages to the temporary bootstrap URI.

According to examples of the present disclosure, computing a derivative of the secret may comprise computing a hash function of an input including the secret.

According to examples of the present disclosure, computing a derivative of the secret may comprise generating an input by combining the secret with a parameter and computing the derivative of the generated input.

According to examples of the present disclosure, combining the secret with a parameter may comprise concatenating the secret with the parameter.

According to examples of the present disclosure, generating a temporary bootstrap URI may further comprise combining a parameter with the at least a part of the computed derivative and static bootstrap URI for the network.

According to examples of the present disclosure, the parameter may comprise at least one of an identifier of the device, a random variable, and/or a time stamp. According to examples of the present disclosure the time stamp may be rounded to a closest full UTC time period such as a closest hour, half hour etc.

According to examples of the present disclosure, the secret that is shared with an LWM2M server entity reachable via the network may comprise a secret that is specific to the device.

According to other examples of the present disclosure, the secret that is shared with an LWM2M server entity reachable via the network may comprise a secret that is common to at least two devices.

According to another aspect of the present disclosure, there is provided a method for managing bootstrapping of devices operable to connect to a network. The devices are operable to run Light Weight Machine to Machine (LWM2M) clients and each device is provided with a security credential that comprises a secret which is shared with an LWM2M server entity reachable via the network. The method, performed by a bootstrap load balancer, comprises, for devices operable to connect to the network, obtaining the secret shared with an LWM2M entity reachable via the network, computing a derivative of the secret, and, generating a temporary bootstrap Uniform Resource Identifier (URI) corresponding to the device by combining at least a part of the computed derivative with a static bootstrap URI for the network. The method further comprises updating a network Domain Name Server (DNS) registry to map the generated temporary bootstrap URIs to the Internet Protocol (IP) address of at least one of an LWM2M bootstrap server instance reachable via the network and/or the bootstrap load balancer.

According to examples of the present disclosure, the devices may be constrained devices.

According to examples of the present disclosure, the bootstrap load balancer may run on an LWM2M bootstrap server or other LWM2M entity. According to such examples, the bootstrap load balancer may have access to the shared secrets and may therefore obtain shared secrets for devices operable to connect to the network by reading the shared secrets from a memory. According to further examples of the present disclosure, the bootstrap load balancer may run independently of any LWM2M entity. According to such examples, the bootstrap load balancer may have a secure connection to, for example, an LWM2M server, and may query the LWM2M server to obtain the shared secrets.

According to examples of the present disclosure, updating a network DNS registry may comprise updating the network DNS register to map a first subset of temporary bootstrap URIs to an IP address of a first LWM2M bootstrap server instance reachable via the network and a second subset of temporary bootstrap URIs to an IP address of a second LWM2M bootstrap server instance reachable via the network.

According to examples of the present disclosure, the method may further comprise generating an allocation of temporary bootstrap URIs to bootstrap server instances.

According to such examples, updating a network DNS registry may comprise updating the network DNS registry to map the generated temporary bootstrap URIs in accordance with the generated allocation.

According to examples of the present disclosure, generating an allocation of temporary bootstrap URIs to bootstrap server instances may comprise distributing temporary bootstrap URIs across bootstrap server instances according to a criterion including at least one of even distribution of temporary bootstrap URIs across bootstrap server instances, a load balancing algorithm, distribution according to resource allocation to bootstrap server instances, geographic distribution, client based distribution. Examples of load balancing algorithms may include Round Robin, Least Connections, etc.

According to examples of the present disclosure in which updating a network DNS registry comprises updating the network DNS registry to map the generated temporary bootstrap URIs to the IP address of the bootstrap load balancer, the method may further comprise receiving a bootstrap request from a device, sending a holding response to the device, initiating generation of a bootstrap server instance to carry out bootstrapping of the device, and updating the network DNS register to map a temporary bootstrap URI to which the received bootstrap request was sent to an IP address of the generated bootstrap server instance.

According to examples of the present disclosure, the method may further comprise receiving a notification from a bootstrap server instance that the bootstrap server instance has commenced bootstrapping of an identified device.

According to examples of the present disclosure, the method may further comprise receiving a notification from a bootstrap server instance that the bootstrap server instance has completed bootstrapping of an identified device.

According to examples of the present disclosure, the method may further comprise checking for occurrence of an address generation trigger and, on occurrence of the address generation trigger, generating new temporary bootstrap URIs corresponding to devices operable to connect to the network, and updating the network DNS registry to map the new generated temporary bootstrap URIs to the IP address of at least one of an LWM2M bootstrap server instance reachable via the network and/or the bootstrap load balancer.

According to examples of the present disclosure, the address generation trigger may comprise a timer, a duration of which may in some examples be not shorter than a DNS caching time. According to further examples, the address generation trigger may be a trigger event.

According to examples of the present disclosure, the method may further comprise identifying devices for which a notification of bootstrapping commenced has not been received, and generating new temporary bootstrap URIs corresponding only to those devices for which a notification of bootstrapping commenced has not been received.

According to examples of the present disclosure, the method may further comprise identifying devices for which a notification of bootstrapping commenced has been received and a notification of bootstrapping completed has not been received, and, during updating of the network DNS registry, maintaining an existing mapping between temporary bootstrap URIs corresponding to identified devices and their respective mapped IP addresses.

According to examples of the present disclosure, computing a derivative of the secret may comprise computing a hash function of an input including the secret.

According to examples of the present disclosure, computing a derivative of the secret may comprise generating an input by combining the secret with a parameter and computing the derivative of the generated input.

According to examples of the present disclosure, combining the secret with a parameter may comprise concatenating the secret with the parameter.

According to examples of the present disclosure, generating a temporary bootstrap URI corresponding to the device may further comprise combining a parameter with the at least a part of the computed derivative and static bootstrap URI for the network.

According to examples of the present disclosure, the parameter may comprise at least one of an identifier of the device, a random variable and/or a time stamp. According to examples of the present disclosure, the time stamp may be rounded to a closest full UTC time period such as a closest hour, half hour etc.

According to examples of the present disclosure, the secret that is shared with an LWM2M server entity reachable via the network may comprise a secret that is specific to the device.

According to examples of the present disclosure, the secret that is shared with an LWM2M server entity reachable via the network may comprise a secret that is common to at least two devices.

According to another aspect of the present disclosure, there is provided a method for bootstrapping a device that is operable to connect to a network, the device operable to run a Light Weight Machine to Machine (LWM2M) client and being provisioned with a security credential comprising a secret that is shared with an LWM2M server entity reachable via the network. The method, performed in a bootstrap server, comprises receiving a bootstrap request from the device, validating the device, commencing a bootstrapping procedure with the device, and sending a notification to a bootstrap load balancer, the notification identifying the device and indicating that bootstrapping of the identified device has commenced.

According to examples of the present disclosure, the device may be a constrained device.

According to examples of the present disclosure, the method may further comprise, on completion of bootstrapping of the device, sending a notification to a bootstrap load balancer, the notification identifying the device and indicating that bootstrapping of the identified device has completed.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non-transitory computer readable media having stored thereon a computer program according to a preceding aspect of the present disclosure.

According to another aspect of the present disclosure, there is provided a device that is operable to connect to a network, the device operable to run a Light Weight Machine to Machine (LWM2M) client and provisioned with a security credential comprising a secret that is shared with an LWM2M server entity reachable via the network. The device comprises a processor and a memory, the memory containing instructions executable by the processor such that the device is operable to compute a derivative of the secret, generate a temporary bootstrap Uniform Resource Identifier (URI) by combining at least a part of the computed derivative with a static bootstrap URI for the network, and send a bootstrap request to the temporary bootstrap URI.

According to examples of the present disclosure, the device may be a constrained device.

According to examples of the present disclosure, the device may be further operable to carry out a method according to any one of the preceding aspects or examples of the present disclosure.

According to another aspect of the present disclosure, there is provided a device that is operable to connect to a network, the device operable to run a Light Weight Machine to Machine (LWM2M) client and provisioned with a security credential comprising a secret that is shared with an LWM2M server entity reachable via the network. The device is adapted to compute a derivative of the secret, generate a temporary bootstrap Uniform Resource Identifier (URI) by combining at least a part of the computed derivative with a static bootstrap URI for the network, and send a bootstrap request to the temporary bootstrap URI.

According to examples of the present disclosure, the device may be a constrained device.

According to examples of the present disclosure, the device may be further adapted to carry out a method according to any one of the preceding aspects or examples of the present disclosure.

According to another aspect of the present disclosure, there is provided a bootstrap load balancer for managing bootstrapping of devices operable to connect to a network, the devices operable to run Light Weight Machine to Machine (LWM2M) clients and each device being provided with a security credential that comprises a secret which is shared with an LWM2M server entity reachable via the network. The bootstrap load balancer comprises a processor and a memory, the memory containing instructions executable by the processor such that the bootstrap load balancer is operable to, for devices operable to connect to the network, obtain the secret shared with an LWM2M server entity reachable via the network, compute a derivative of the secret, and generate a temporary bootstrap Uniform Resource Identifier (URI) corresponding to the device by combining at least a part of the computed derivative with a static bootstrap URI for the network. The bootstrap load balancer is further operable to update a network Domain Name Server (DNS) registry to map the generated temporary bootstrap URIs to the Internet Protocol (IP) address of at least one of an LWM2M bootstrap server instance reachable via the network, and/or the bootstrap load balancer.

According to examples of the present disclosure, the bootstrap load balancer may be further operable to carry out a method according to any one of the preceding aspects or examples of the present disclosure.

According to another aspect of the present disclosure, there is provided a bootstrap load balancer for managing bootstrapping of devices on a network, the devices operable to run Light Weight Machine to Machine (LWM2M) clients and each device being provided with a security credential that comprises a secret which is shared with an LWM2M entity on the network. The bootstrap load balancer is adapted to, for devices operable to connect to the network, obtain the secret shared with an LWM2M entity on the network, compute a derivative of the secret, and assemble a temporary bootstrap Uniform Resource Identifier (URI) corresponding to the device by combining at least a part of the computed derivative with a static bootstrap URI for the network. The bootstrap load balancer further adapted to update a network Domain Name Server (DNS) registry to map the generated temporary bootstrap URIs to the Internet Protocol (IP) address of at least one LWM2M entity in the network.

According to examples of the present disclosure, the bootstrap load balancer may be further adapted to carry out a method according to any one of the preceding aspects or examples of the present disclosure.

According to another aspect of the present disclosure, there is provided a bootstrap server, the bootstrap server comprising a bootstrap load balancer according to any one of the preceding aspects or examples of the present disclosure.

According to another aspect of the present disclosure, there is provided a bootstrap server for bootstrapping a device that is operable to connect to a network, the device operable to run a Light Weight Machine to Machine (LWM2M) client and being provisioned with a security credential comprising a secret that is shared with an LWM2M server entity reachable via the network. The bootstrap server comprises a processor and a memory, the memory containing instructions executable by the processor such that the bootstrap server is operable to receive a bootstrap request from the device, validate the device, commence a bootstrapping procedure with the device, and send a notification to a bootstrap load balancer, the notification identifying the device and indicating that bootstrapping of the identified device has commenced.

According to examples of the present disclosure, the bootstrap server may be further operable to carry out a method according to any one of the preceding aspects or examples of the present disclosure.

According to another aspect of the present disclosure, there is provided a bootstrap server for bootstrapping a device that is operable to connect to a network, the device operable to run a Light Weight Machine to Machine (LWM2M) client and being provisioned with a security credential comprising a secret that is shared with an LWM2M server entity reachable via the network. The bootstrap server is adapted to receive a bootstrap request from the device, validate the device, commence a bootstrapping procedure with the device, and send a notification to a bootstrap load balancer, the notification identifying the device and indicating that bootstrapping of the identified device has commenced.

According to examples of the present disclosure, the bootstrap server may be further adapted to carry out a method according to any one of the preceding aspects or examples of the present disclosure.

According to examples of the present disclosure, the bootstrap server may further comprise a bootstrap load balancer according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

In IoT networks, a bootstrapping mechanism is needed when a device powers up and requests to connect to the network. During the bootstrapping process, the identity of the device is authenticated by a bootstrap server in the network, and the authenticated device is allowed to join to the network. There are several bootstrapping mechanisms and different protocols define their own bootstrapping requirements and procedures.

LWM2M, being a device management protocol for IoT networks, defines its own bootstrapping mechanism. In LWM2M client-initiated bootstrapping, the client reads the bootstrap server URI or IP address from an LWM2M security object on the device and initiates bootstrapping by sending a request to this URI. As discussed above, the static URI mechanism of such an approach is prone to problems related both to security and to scalability. Aspects of the present disclosure provide methods according to which load on an LWM2M bootstrap server may be distributed between different server instances through a dynamic approach to device bootstrapping using LWM2M.

Temporary bootstrap URIs are generated in both a client device and in a bootstrap load balancer, and mapping in a network DNS registry is used to determine which client is connected to which bootstrap server instance. The mapping may be updated over time to reflect evolving conditions in the network.

Figure 1:
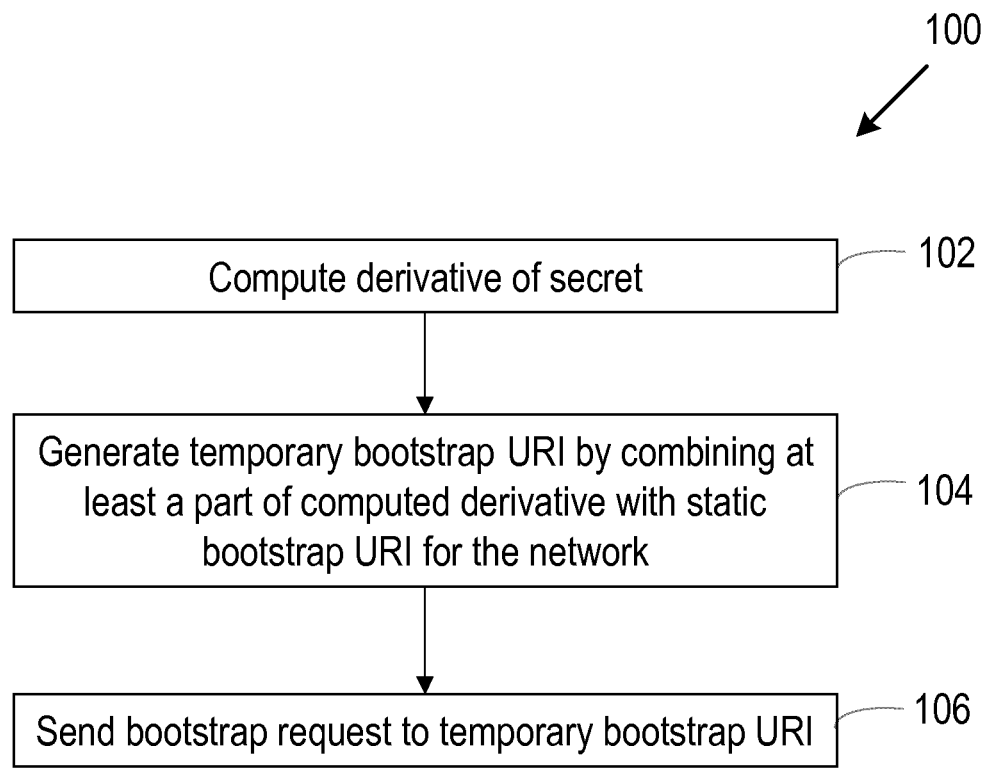
FIG. 1 is a flow chart illustrating process steps in a method for operating a device.

FIG. 1 is a flow chart illustrating process steps in a method 100 for operating a device that is operable to connect to a network in accordance with aspects of the present disclosure. The device conducting the method may be a constrained device as set out above. The device is operable to run an LWM2M client, and is provisioned with a security credential comprising a secret that is shared with an LWM2M server entity reachable via the network. The device may be configured to communicate using a RESTful protocol including for example CoAP, MQTT, HTTP etc. Referring to FIG. 1, in a first step 102, the device computes a derivative of the secret. In step 104, the device generates a temporary bootstrap URI by combining at least a part of the computed derivative with a static bootstrap URI for the network. In step 106, the device sends a bootstrap request to the temporary bootstrap URI. Aspects of the present disclosure thus introduce a new process to client-initiated bootstrapping, according to which a temporary bootstrap URI is generated by the device. The device bootstrap request is then sent to the generated temporary URI. As discussed in further detail below, an equivalent process is conducted by a bootstrap load balancer to generate the same temporary URI as is generated in the device, and to ensure that the temporary URI is mapped in a network DNS to an appropriate IP address, which may be the IP address of a bootstrap server instance or may be the IP address of the bootstrap load balancer itself.

Figure 2:
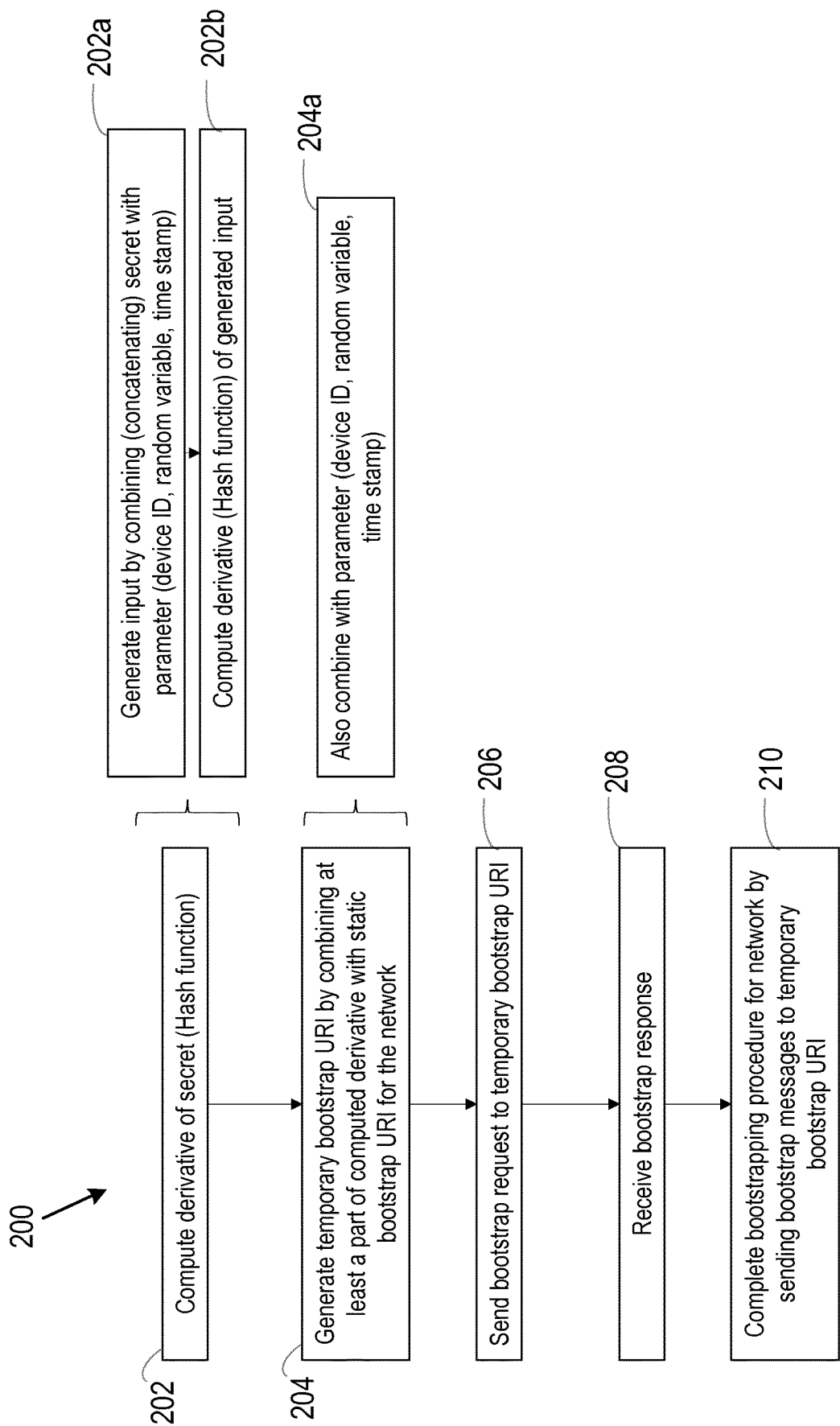
FIG. 2 is a flow chart illustrating process steps in another example of method for operating a device.

FIG. 2 is a flow chart illustrating process steps in another example of a method 200 for operating a device that is operable to connect to a network in accordance with aspects of the present disclosure. The steps of the method 200 illustrate one way in which the steps of the method 100 may be implemented and supplemented in order to achieve the above discussed and additional functionality. As for the method of FIG. 1 above, the device conducting the method may be a constrained device as set out above. The device is operable to run an LWM2M client, and is provisioned with a security credential comprising a secret that is shared with an LWM2M server entity reachable via the network. The security credential may be any security credential stored on the device and comprising a secret that is shared with an LWM2M server entity reachable via the network. The shared secret may for example be a pre-shared key, a raw public key, or any other available solution for LWM2M devices. Example security credentials may include a 3GPP security credential such as may be stored on a USIM. In some examples of the present disclosure, the secret may be unique to a particular device. In other examples, the secret may be common to one or more devices which may connect to the network. The LWM2M server entity with which the secret is shared may in some examples be an LWM2M server and/or may be an LWM2M bootstrap server. The device may be configured to communicate using a RESTful protocol including for example CoAP, MQTT, HTTP etc.

Referring to FIG. 2, in a first step 202, the device computes a derivative of the secret. The process of computing a derivative of the secret may comprise computing a hash function of an input comprising the secret. In other examples, computing the derivative may comprise computing a function other than a hash function. The function may be computed on the basis of an input comprising the secret and may produce the derivative, which may comprise a specified number of characters. The characters may be alphanumeric characters, numeric digits etc. As illustrated in FIG. 2, step 202 may comprise generating an input by combining the secret with a parameter at step 202a, and computing the derivative of the input, such as a hash of the input, at step 202b. The parameter with which the secret is combined may comprise a random variable, a time stamp, or a device specific parameter such as a device identifier (ID). As mentioned above, an equivalent process is conducted in a bootstrap load balancer in order to generate the same temporary bootstrap URI as is generated in the device, and to update a network DNS register with appropriate mapping. In order to ensure that the bootstrap load balancer may generate an identical temporary URI to that generated in the device, in examples in which a parameter such as a random variable or time stamp is used, measures may be implemented to ensure that an identical random variable or time stamp is used in both the device and the bootstrap load balancer. Thus, in some examples, if a time stamp is used, the time stamp may be rounded to a nearest unit, such as a nearest UTC hour or half hour etc. in Unix time. In examples in which a random variable is used, the logic for random variable generation may be identical in the device and bootstrap load balancer, so as to ensure that the same random variable will be generated by both the device and the bootstrap load balancer.

The parameter and secret may be combined in any appropriate manner to form the input to the hash function. In some examples, the parameter and secret may be concatenated, or the parameter may be inserted into the secret or vice versa. The logic for combining the parameter and secret is identical in the device and bootstrap load balancer. The calculation of the derivative may be implementation specific. Existing methods such as that described in IETF RFC 6920 may be used. In the case of a hash function, a sample "ni" un may be:

ni:///sha-256;UyaQV-Ev4rdLoHyJJWCi11HfrYv9E1aGQAIMO2X_-Q

Referring again to FIG. 2, in step 204, the device generates a temporary bootstrap URI by combining at least a part of the computed derivative with a static bootstrap URI for the network. The static bootstrap URI for the network is configured within a security object on the device and is read by the device from the security object. The computed derivative and static bootstrap URI may be combined in various ways to generate the temporary bootstrap URI. In one example, the last three characters of the derivative (for example the last three digits of the hash) can be attached to the static bootstrap server URI in the following manner:

Last three digits of hash: 486
Static bootstrap server URI: bs.myserver.com
Generated temporary bootstrap server URI: bs486.myserver.com It will be appreciated that any part or parts of the derivative, including the last X characters, the first X characters and/or any number of X characters up to and including the entire derivative may be inserted into the static bootstrap URI to create the temporary bootstrap URI. The specified X characters of the derivative may be consecutive or non-consecutive. The part or parts of the derivative may be inserted at any point of the static bootstrap URI such that the resulting temporary bootstrap URI is consistent with the URI Generic Syntax defined in IETF RFC 3986. The precise manner in which the computed derivative is used to generate the temporary bootstrap URI is also implementation specific. In some examples, as illustrated at step 204a, a parameter may also be combined with the computed derivative and static bootstrap URI to generate the temporary bootstrap URI. The parameter may be the same parameter as was used in generating the input to the derivative function or may be a different parameter. Example parameters which may be used include a device ID, time stamp (appropriately rounded as discussed above) and/or random variable. As for the computed derivative, any part or parts of the parameter may be inserted at any point of the static bootstrap URI such that the resulting temporary bootstrap URI is consistent with the URI Generic Syntax. In some examples, the part or parts of the parameter may be combined with the part or parts of the computed derivative before being inserted into the static bootstrap URI.

In some examples, the method may comprise repeating steps 202 and 204 after a predetermined time period or interval. In this manner, the temporary bootstrap URI may be periodically updated. In other examples, steps 202 and 204 may be performed only when the device is preparing to send a bootstrap request. It will be appreciated that the use of a shared secret in generating a temporary bootstrap URI ensures confidentiality between the client device and the LWM2M server entity. Temporary bootstrap URIs may be specific to individual devices, for example owing to use of a device specific shared secret, and/or use of a device identifier or other device specific parameter in generation of the derivative function input and/or the temporary bootstrap URI. Such device specific temporary bootstrap URIs may provide additional security towards bootstrap server instances reachable via the network.

Referring again to FIG. 2, in step 206, the device sends a bootstrap request to the temporary bootstrap URI. In step 208 the device receives a bootstrap response, and the device then completes a bootstrapping procedure for the network by sending bootstrap messages to the temporary bootstrap URI in step 210. As discussed in further detail below, measures may be taken at the bootstrap load balancer to ensure that a temporary bootstrap URI remains valid and mapped to the same bootstrap server instance over the course of a bootstrapping procedure.

Figure 3:
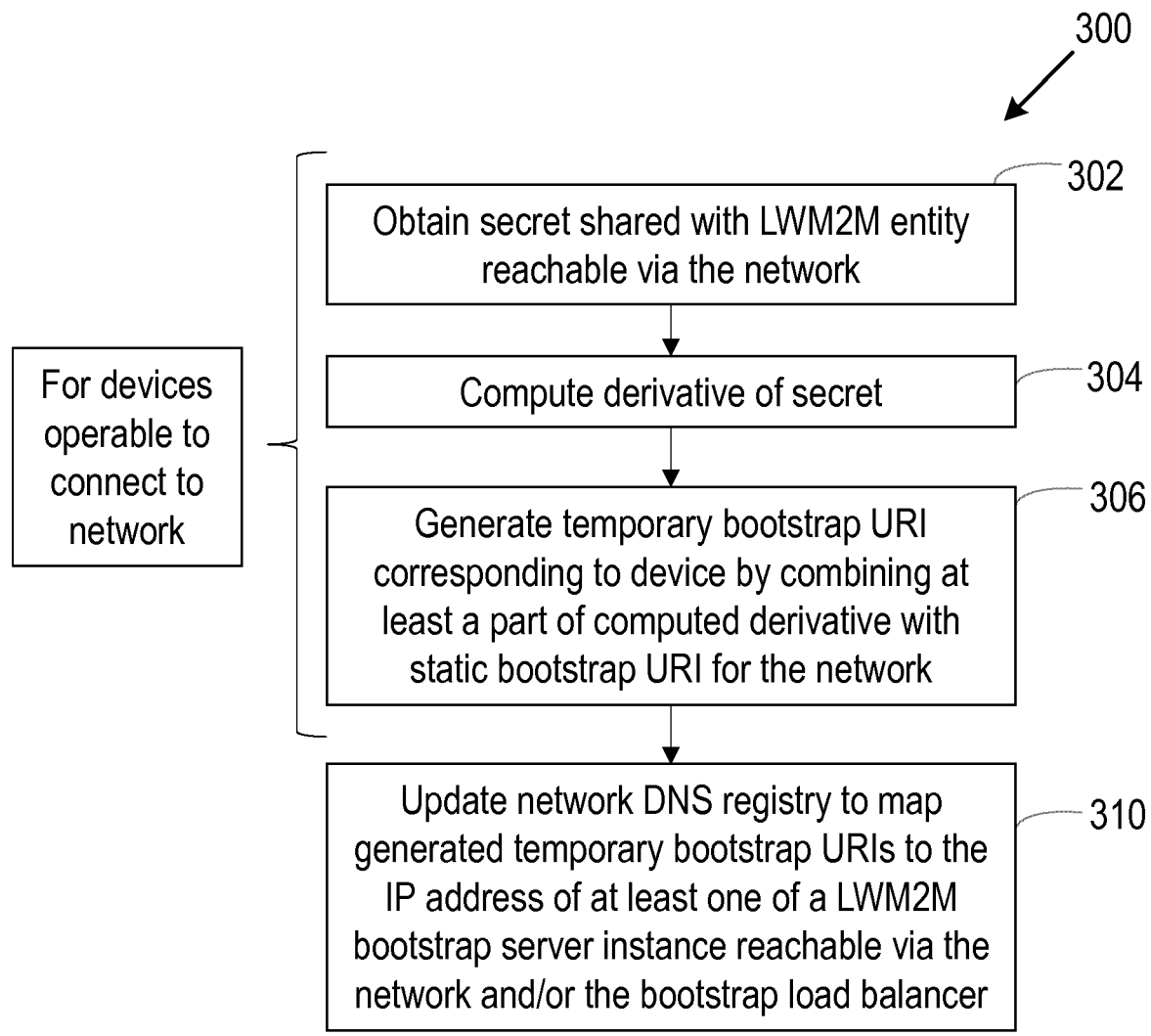
FIG. 3 is a flow chart illustrating process steps in a method for managing bootstrapping of devices.

In order for a device to be able to initiate bootstrapping using a temporary bootstrap URI generated as discussed above, the temporary bootstrap URI must point to a valid IP address in the network of the bootstrap server corresponding to the device. FIGS. 3, 4 and 5 illustrate methods that may be carried out in a bootstrap load balancer to ensure that this is the case.

FIG. 3 is a flow chart illustrating process steps in a method for managing bootstrapping of devices operable to connect to a network. As discussed above, the devices may be constrained devices. The devices are operable to run LWM2M clients, and each device is provisioned with a security credential comprising a secret that is shared with an LWM2M server entity reachable via the network. The devices may be configured to communicate using a RESTful protocol including for example CoAP, MQTT, HTTP etc. The method is carried out by a bootstrap load balancer. The bootstrap load balancer may be running within an instance of an LWM2M bootstrap server, an instance of an LWM2M server, or may be running independently of any LWM2M server entity.

Referring to FIG. 3, in a first step 302, the bootstrap load balancer obtains a secret that is shared between a device operable to connect to the network and an LWM2M server entity. If the bootstrap load balancer is running within an LWM2M server entity, the bootstrap load balancer may have access to the shared secret and may read the shared secret from a memory. If the bootstrap load balancer is not running within an LWM2M server entity, the bootstrap load balancer may be provided with a secure connection, for example to an LWM2M server, and may query the LWM2M server to obtain the shared secret. In step 304, the bootstrap load balancer computes a derivative of the secret and in step 306, the bootstrap load balancer generates a temporary bootstrap URI by combining at least a part of the computed derivative with a static bootstrap URI for the network. As illustrated in FIG. 3, the bootstrap load balancer conducts steps 302 to 306 for devices operable to connect to the network, and may carry out steps 302 to 306 for all devices operable to connect to the network. This may be limited to all devices operable to connect to the network and which have not already at least commenced a bootstrapping procedure with the network, as discussed in further detail below.

Referring still to FIG. 3, in step 310, the bootstrap load balancer updates a network DNS registry to map the generated temporary bootstrap URIs to the IP address of at least one of an LWM2M bootstrap server instance reachable via the network and/or the bootstrap load balancer itself. As discussed in further detail below with reference to FIGS. 4*a*, 4*b*, 5*a* and 5*b*, in examples in which one or more instances of an LWM2M bootstrap server are available and reachable via the network, the bootstrap load balancer may update the network DNS registry to map the temporary bootstrap URIs to the IP address of one or more of the available LWM2M bootstrap server instances. In examples in which no LWM2M bootstrap server instance is available, for example in a cloud-based implementation in which LWM2M bootstrap server instances may be generated on demand, the bootstrap load balancer may initially update the network DNS registry to map all generated temporary bootstrap URIs to the IP address of the bootstrap load balancer. Subsequent updating of the network DNS registry may map individual temporary URIs to generated LWM2M bootstrap server instances, as discussed below with reference to FIGS. 5*a* and 5*b*.

The method 300 performed in the bootstrap load balancer thus compliments the methods 100, 200 performed in the device(s). The bootstrap load balancer follows the same process as is followed in the client device(s) to generate temporary bootstrap URIs corresponding to each device which is operable to connect to the network. The bootstrap load balancer then maps the temporary bootstrap URIs to one or more IP addresses, either of LWM2M bootstrap server instances or of the bootstrap load balancer itself. The steps of the method 300 may be repeated periodically such that the temporary URIs and mapping in the DNS register are periodically updated.

Figure 4A:
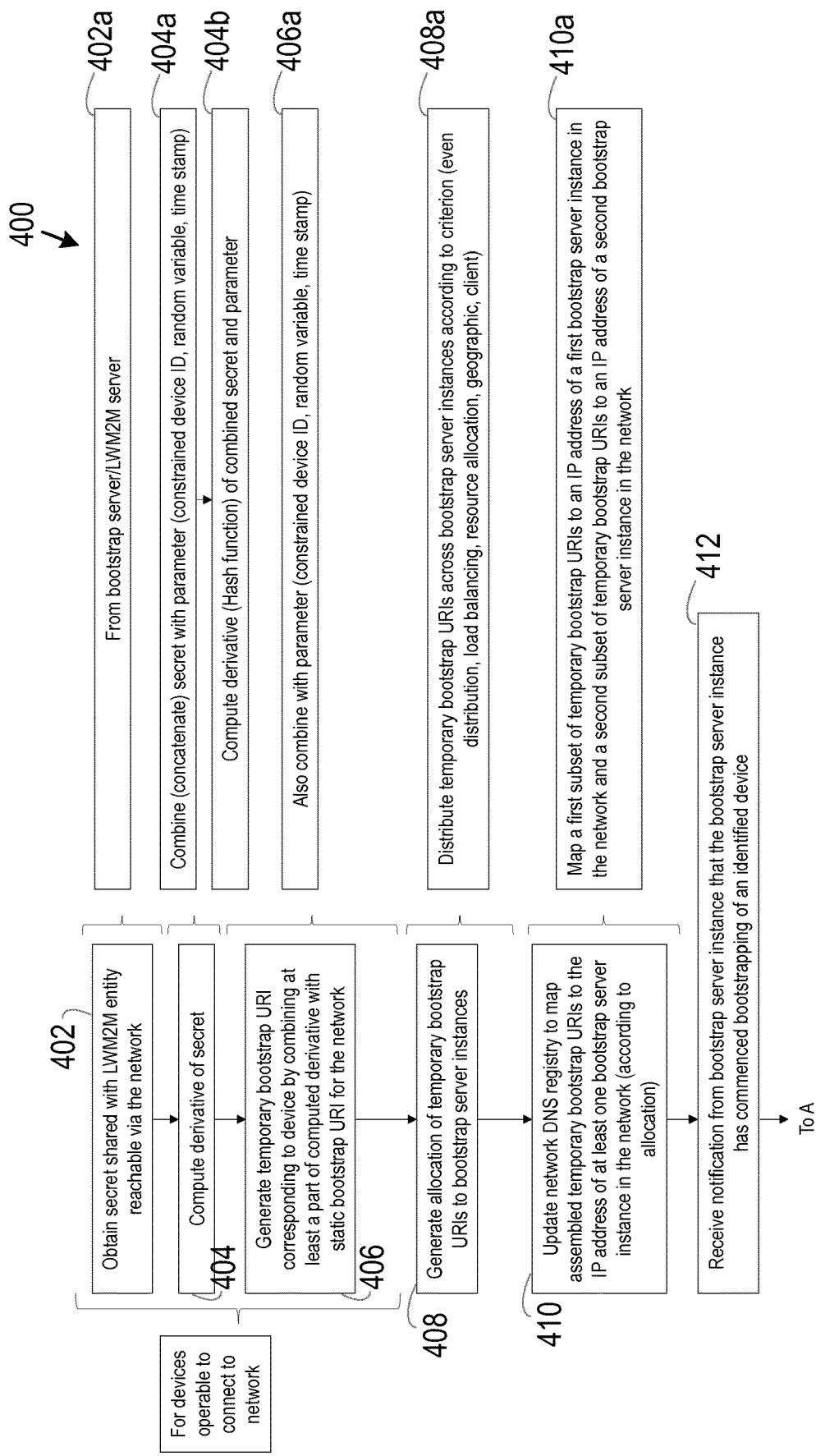
FIGS. 4a and 4b are flow charts illustrating another example of method for managing bootstrapping of devices.
Figure 4B:
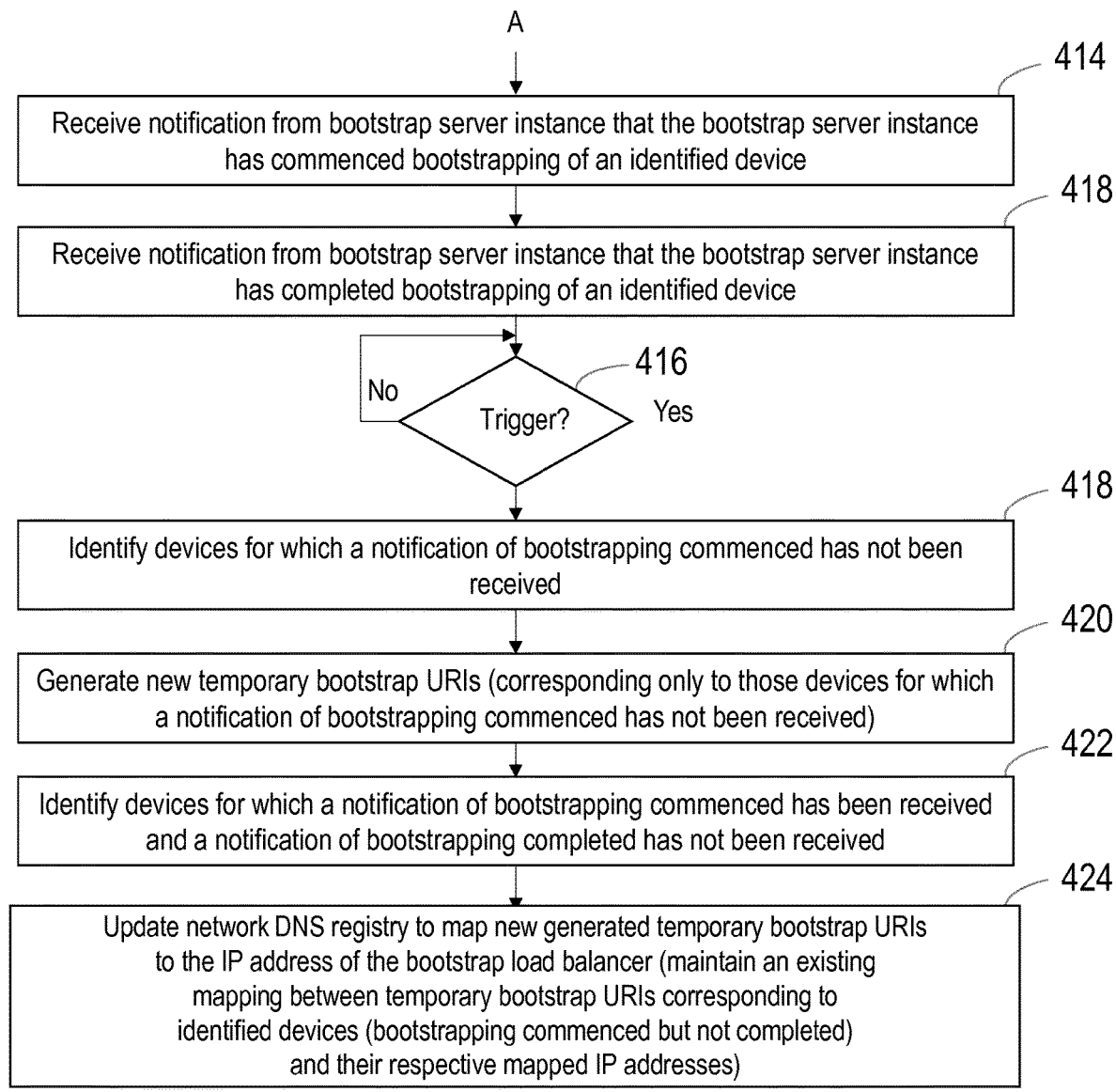

FIGS. 4*a* and 4*b* illustrate process steps in another example of method 400 for managing bootstrapping of devices operable to connect to a network. The steps of the method 400 illustrate one way in which the steps of the method 300 may be implemented and supplemented in order to achieve the above discussed and additional functionality. As for the method 300 of FIG. 3, the devices may be constrained devices. The devices are operable to run LWM2M clients, and each device is provisioned with a security credential comprising a secret that is shared with an LWM2M server entity reachable via the network. As discussed above with reference to FIG. 2, the security credential may be any security credential stored on the device and comprising a secret that is shared with an LWM2M server entity reachable via the network. The shared secret may for example be a pre-shared key, a raw public key, or any other available solution for LWM2M devices. In some examples of the present disclosure, the secret may be unique to a particular device. In other examples, the secret may be common to one or more devices which may connect to the network. The devices may be configured to communicate using a RESTful protocol including for example CoAP, MQTT, HTTP etc. The method 400 is carried out by a bootstrap load balancer and illustrates an example in which the bootstrap load balancer is running within an instance of an LWM2M bootstrap server.

Referring to FIG. 4*a*, in a first step 402, the bootstrap load balancer obtains a secret that is shared between a device operable to connect to the network and an LWM2M server entity. As in the illustrated example the bootstrap load balancer is running within an LWM2M bootstrap server, the bootstrap load balancer may have access to the shared secret and may read the shared secret from a memory. In step 404, the bootstrap load balancer computes a derivative of the secret and in step 406, the bootstrap load balancer generates a temporary bootstrap URI by combining at least a part of the computed derivative with a static bootstrap URI for the network. As illustrated in FIG. 4*a*, the bootstrap load balancer conducts steps 402 to 406 for devices operable to connect to the network. As illustrated in steps 404*a*, 404*b* and 406*a*, the steps of computing a derivative of the shared secret and generating a temporary bootstrap URI corresponding to the device may be conducted in exactly the same manner as is discussed above for the equivalent procedures conducted in the device(s). That is the derivative may be a hash function and may be calculated on an input comprising a combination of the shared secret and a parameter. The temporary bootstrap URI may be generated by combining the computer derivative with a static bootstrap URI and in some examples a parameter. For a full discussion of the options for carrying out steps 404 and 406, reference is made to the discussion of steps 202 and 204 above.

It will be appreciated that the steps 402 to 406 may be repeated individually for all devices operable to connect to the network, for example if the temporary bootstrap URIs are unique to each device (owing to use of a device specific shared secret, device ID or other device specific parameter in generation of the input to the derivative and/or temporary bootstrap URI). In other examples in which temporary bootstrap URIs are not device specific, the steps 402 to 406 may be repeated an appropriate number of times to generate temporary bootstrap URIs corresponding to those that will be generated by all devices operable to connect to the network.

In order to ensure that the temporary bootstrap URIs generated by the bootstrap load balancer match the temporary bootstrap URIs generated in individual devices, the logic for generating the temporary bootstrap URIs should be the same in both the devices and the bootstrap load balancer. That is the logic indicating which parameter(s) (if any) to use in generating the input to the derivative function and the temporary bootstrap URI, what derivative function to use, how to generate additional parameters (rounding of a time stamp, random variable generation etc.) and how to combine the various elements to form the input and the temporary bootstrap URI (which characters of the computed derivative to use and how to combine them into the static bootstrap URI etc.), should be shared between the devices and the bootstrap load balancer. In some examples, this logic may also be shared with bootstrap server instances to enable verification of temporary bootstrap URIs against device data, as discussed in further detail below with reference to FIG. 6. The logic for generating temporary bootstrap URIs may be abstracted as a smart object resource and included in the security (bootstrap) object configured in devices at manufacture. Similar logic, including when to regenerate temporary URIs (which may be linked to a unit of time for rounding of a time stamp), may be configured in a bootstrap load balancer (and bootstrap server) on instantiation of these functions or on manufacture of physical elements performing the functions.

In step 408, the bootstrap load balancer generates an allocation of temporary bootstrap URIs to bootstrap server instances. As illustrated in step 408a, this may comprise distributing temporary bootstrap URIs across bootstrap server instances according to a criterion. The criterion may in some examples implement even distribution of temporary bootstrap URIs across all existing bootstrap server instances. Alternatively, a load balancing algorithm such as Round Robin or Least Connections may be used to generate the allocation. In further examples, distribution according to resource allocation to bootstrap server instances may be implemented. This may be appropriate for example in cloud-based implementations, in which resources allocated to individual instances of bootstrap servers may vary and may change over time. In still further examples, temporary bootstrap URIs may be distributed among bootstrap server instances according to a geographic distribution of client devices and/or a client-based distribution. Some of the above criteria may be combined in order to generate an allocation appropriate to different circumstances.

In step 410, the bootstrap load balancer updates the network DNS registry to map the assembled temporary bootstrap URIs to the IP address of at least one bootstrap server instance reachable via the network. This may comprise mapping the temporary bootstrap URIs to IP addresses of bootstrap server instances according to the allocation generated in step 408. As illustrated in step 410a, the mapping may comprise mapping a first subset of temporary bootstrap URIs to an IP address of a first LWM2M bootstrap server instance reachable via the network and a second subset of temporary bootstrap URIs to an IP address of a second LWM2M bootstrap server instance reachable via the network. Updating the network DNS registry with the appropriate mapping has the effect of ensuring that a bootstrap request sent by a client device to a generated temporary bootstrap URI will be delivered directly to a bootstrap server instance. The bootstrap server instance may then validate the device and conduct the bootstrap procedure with the device, as discussed in further detail below. If a temporary bootstrap URI generated by a device is invalid, a bootstrap request sent to that address will be automatically rejected by the network, as the URI will not be matched with any IP address in the DNS registry.

In step 412, the bootstrap load balancer receives a notification from a bootstrap server instance that the bootstrap server instance has commenced bootstrapping of an identified device. Referring now to FIG. 4b, in step 414, the bootstrap load balancer receives a notification from a bootstrap server instance that the bootstrap server instance has completed bootstrapping of an identified device. It will be appreciated that notifications received in steps 412 and 414 may be received at any time during conducting of the method 400 and may be received multiple times, as different devices attempt to initiate bootstrap procedure with the network.

In step 416, the bootstrap load balancer checks for occurrence of an address generation trigger. This may for example be expiry of a timer implementing periodic updating of temporary bootstrap URIs. In the example of a timer, the timer may be set such that the duration of the timer is at least as long as a DNS caching time. The duration of the timer may also correspond to a rule set in both devices and the bootstrap load balancer regarding how to generate the time stamp. For example, if timestamps to the nearest hour are to be used in generating temporary bootstrap URIs, then the timer for updating of temporary bootstrap URIs may be set to expire every hour. In other examples, the address generation trigger may comprise a trigger event. The nature and details of the trigger may be implementation specific. On occurrence of the address generation trigger, the bootstrap load balancer identifies devices for which a notification of bootstrapping commenced has not yet been received in step 418. In step 420, the bootstrap load balancer then generates new temporary bootstrap URIs corresponding only to those devices for which a notification of bootstrapping commenced has not yet been received. In step 422, the bootstrap load balancer identifies devices for which a notification of bootstrapping commenced has been received and a notification of bootstrapping completed has not been received. Such devices are currently undergoing bootstrapping. In step 424, the bootstrap load balancer updates the network DNS registry to map the new generated temporary bootstrap URIs to IP addresses of bootstrap server instances reachable via the network. The updated mapping may correspond to an updated allocation generated following generation of the new temporary bootstrap URIs. The new allocation may take account of a change in the number of temporary bootstrap URIs, generation of a new bootstrap server instance, changes in the load or resources of a bootstrap server instance etc. During the updating of the DNS registry, the bootstrap load balancer maintains an existing mapping between temporary bootstrap URIs corresponding to devices identified in step 418 and their respective mapped IP addresses. This ensures that temporary bootstrap URIs being used by devices in the process of conducting bootstrapping with a bootstrap server instance remain valid during the bootstrapping process.

Figure 5A:
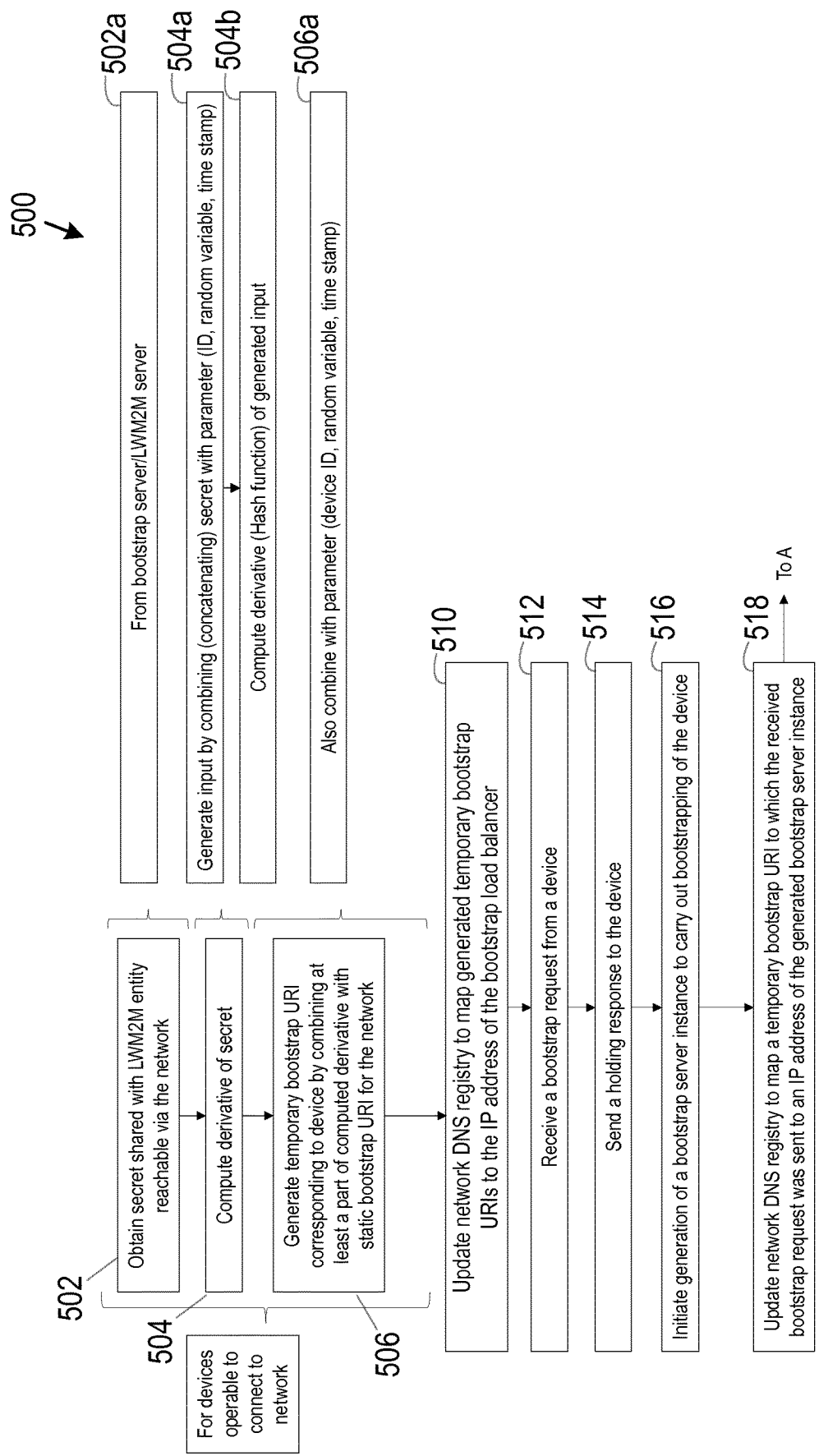
FIGS. 5a and 5b are flow charts illustrating another example of method for managing bootstrapping of devices.
Figure 5B:
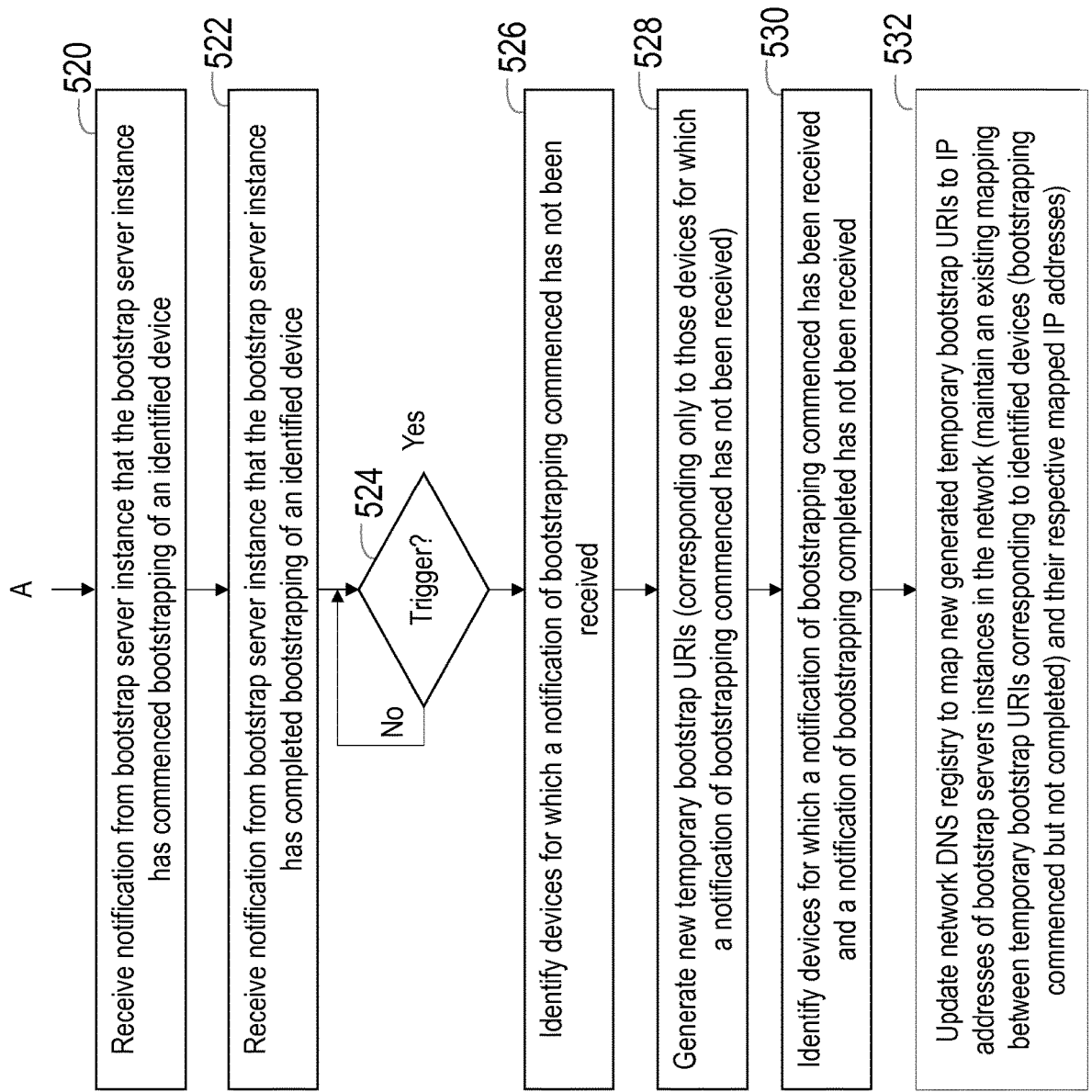

FIGS. 5a and 5b illustrate process steps in another example of method 500 for managing bootstrapping of devices operable to connect to a network. The steps of the method 500 illustrate another way in which the steps of the method 300 may be implemented and supplemented in order to achieve the above discussed and additional functionality. As for the method 300 of FIG. 3, the devices may be constrained devices. The devices are operable to run LWM2M clients, and each device is provisioned with a security credential comprising a secret that is shared with an LWM2M server entity reachable via the network. As discussed above with reference to FIG. 2, the security credential may be any security credential stored on the device and comprising a secret that is shared with an LWM2M server entity reachable via the network. The shared secret may for example be a pre-shared key, a raw public key, or any other available solution for LWM2M devices. In some examples of the present disclosure, the secret may be unique to a particular device. In other examples, the secret may be common to one or more devices which may connect to the network. The devices may be configured to communicate using a RESTful protocol including for example CoAP, MQTT, HTTP etc. The method 500 is carried out by a bootstrap load balancer and illustrates an example in which the bootstrap load balancer is not running within a bootstrap server instance but is running independently, for example on the cloud.

Referring to FIG. 5a, the bootstrap load balancer generates temporary bootstrap URIs corresponding to devices operable to connect to the network in steps 502, 504 and

506. The process is substantially as described above with reference to FIGS. 4a and 2, and reference is made to that discussion for further detail. In the example illustrated in FIGS. 5a and 5b, it is envisaged that there may be no instances of an LWM2M bootstrap server running at the time at which an initial mapping of temporary bootstrap URIs is performed. According to the illustrated example, bootstrap server instances may be dynamically generated on demand, as discussed in further detail below. The process of obtaining the shared secret for devices operable to connect to the network may therefore comprise querying an LWM2M server to obtain the shared secret. The bootstrap load balancer may be provided with a secure connection to the LWM2M server for this purpose.

In step 510, the bootstrap load balancer updates the network DNS registry to map the generated temporary bootstrap URIs to the IP address of the bootstrap load balancer. It will be appreciated that in the absence of any bootstrap server instances, there is no need to generate an allocation and there are no bootstrap server instance IP addresses to which the temporary bootstrap URIs may be mapped. In step 512, the bootstrap load balancer receives a bootstrap request from a device. The request is sent by the device to a temporary bootstrap URI and, owing to the mapping in the DNS registry, is received by the bootstrap load balancer. In step 514 the bootstrap load balancer sends a holding reply to the device. Every LWM2M interaction has a timeout of a few seconds if no response is received. The holding response may take the form of a notification or other response that has the function of keeping the connection initiated by the bootstrap request alive. The bootstrap load balancer then initiates generation of a bootstrap server instance to carry out bootstrapping of the device in step 516. In step 518, the bootstrap load balancer updates the network DNS registry to map the temporary bootstrap URI to which the received bootstrap request was sent to the IP address of the generated bootstrap server instance. In this manner, future messages sent by the device to the temporary bootstrap URI will be received by the newly generated bootstrap server instance and bootstrapping of the device may be carried out. In some examples, the bootstrap sever instance information may be pre-provisioned, with only the device identifier for the device requesting bootstrap, the appropriate shared secret and the appropriate LWM2M server address for the device to be provisioned when the bootstrap server instance is generated. At least the device identifier may be provided by the bootstrap load balancer when initiating generation of the bootstrap server instance.

Referring now to FIG. 5b, steps 520 to 530 of the method 500 correspond to steps 412 to 422 of the method 400. For a detailed discussion of these steps reference is made to the description of FIGS. 4a and 4b above. Following steps 520 to 530, in which notifications of bootstrapping commented/complete are received, an address generation trigger is checked and, if appropriate, new temporary bootstrap URIs are generated for devices not yet having commenced bootstrapping, the bootstrap load balancer updates the network DNS registry at step 532. The DNS registry is updated to map the new generated temporary bootstrap URIs to the IP address of the bootstrap load balancer. During the updating of the DNS registry, the bootstrap load balancer maintains an existing mapping between temporary bootstrap URIs corresponding to devices identified in step 530 and their respective mapped IP addresses. This ensures that temporary bootstrap URIs being used by devices in the process of conducting bootstrapping with a bootstrap server instance remain valid during the bootstrapping process.

Figure 6:
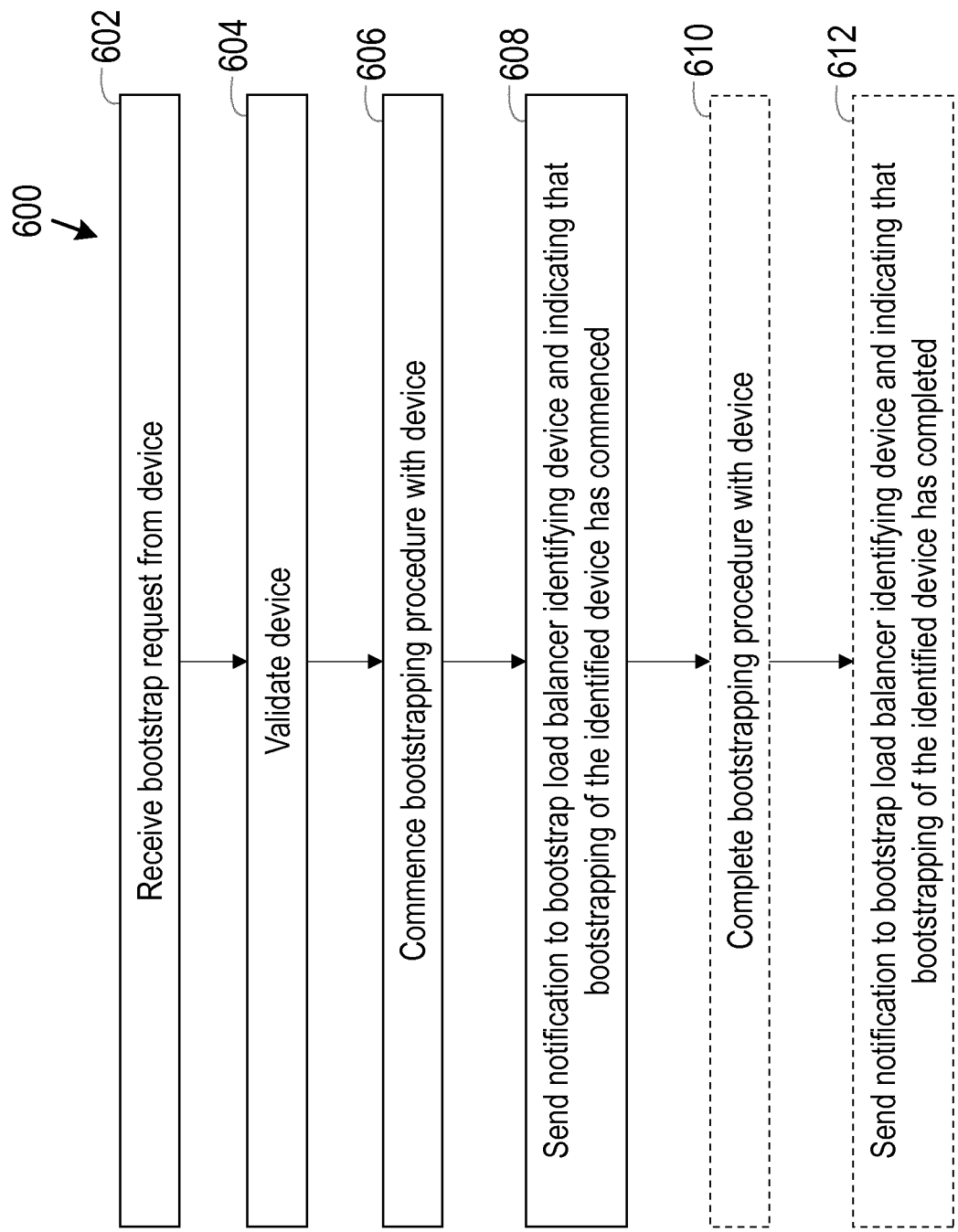
FIG. 6 is a flow chart illustrating process steps in a method for bootstrapping a device.

FIG. 6 is a flow chart illustrating process steps in a method 600 for bootstrapping a device that is operable to connect to a network. As discussed above, the device may be a constrained device. The device is operable to run an LWM2M client, and is provisioned with a security credential comprising a secret that is shared with an LWM2M server entity reachable via the network. The device may be configured to communicate using a RESTful protocol including for example CoAP, MQTT, HTTP etc. The method is carried out by a bootstrap server.

Referring to FIG. 6, in a first step 602, the bootstrap server receives a bootstrap request from the device. As discussed above, the bootstrap request may have been sent by the device to a temporary bootstrap URI and may be received by the bootstrap server owing to mapping in a network DNS registry updated by a bootstrap load balancer. In step 604, the bootstrap server validates the device. This may comprise matching the temporary bootstrap URI to which the bootstrap request was sent to the appropriate client information of the device. The appropriate information for matching and the format in which it is contained within the URI may be programmed in the bootstrap server and may correspond to the logic in the device and bootstrap load balancer for generating temporary bootstrap URIs. In step 606, if validation is successful, the bootstrap server commences a bootstrapping procedure with the device, and in step 608, the bootstrap server sends a notification to a bootstrap load balancer, the notification identifying the device and indicating that bootstrapping of the identified device has commenced. In step 610, the bootstrap server may complete bootstrapping of the device, and in step 612, the bootstrap server may send a notification to a bootstrap load balancer, the notification identifying the device and indicating that bootstrapping of the identified device has completed.

The methods performed at the device, the bootstrap load balancer and a bootstrap server instance cooperate to enable load balancing between bootstrap server instances, as well as providing increased security and decreased attack surface for the bootstrap server through the use of temporary bootstrap URIs for bootstrap server instances. Operation of example methods according to the present disclosure is illustrated in FIGS. 7, 8 and 9.

Figure 7:
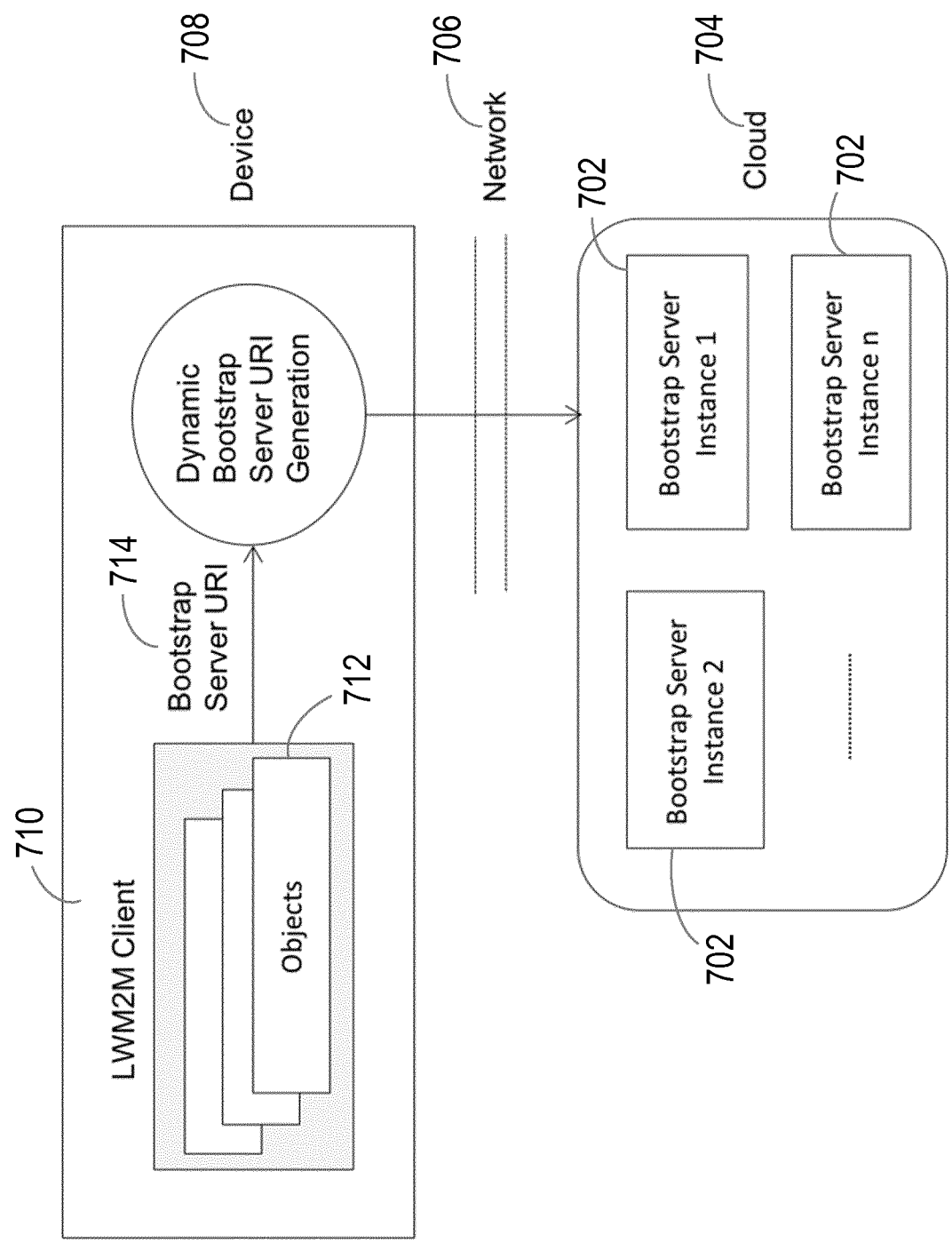
FIG. 7 illustrates an implementation of example methods for operating a device and managing bootstrapping of devices.

FIG. 7 illustrates an example implementation in which n bootstrap server instances 702 are running in the cloud 704. A bootstrap load balancer (not shown) has performed an example of the method 300, 400 or 500, generating temporary bootstrap URIs corresponding to devices operable to connect to the network 706 and updating a network DNS registry with mapping between the temporary bootstrap URIs and the IP addresses of the bootstrap server instances 702. As illustrated in FIG. 7, a device 708 operable to connect to the network 706 is running an LWM2M client 710 and is provisioned with a plurality of objects 712. The device 708 extracts a static bootstrap URI 714 from one of the objects 712 and uses this, together with a derivative of a shared secret, to generate a temporary bootstrap URI (referred to as a dynamic bootstrap server URI in the Figure). The device 708 sends a bootstrap request to the generated temporary bootstrap URI, and this request is received at one of the bootstrap server instances 702 running on the cloud 704 thanks to the DNS mapping updated by the bootstrap load balancer.

Figure 8:
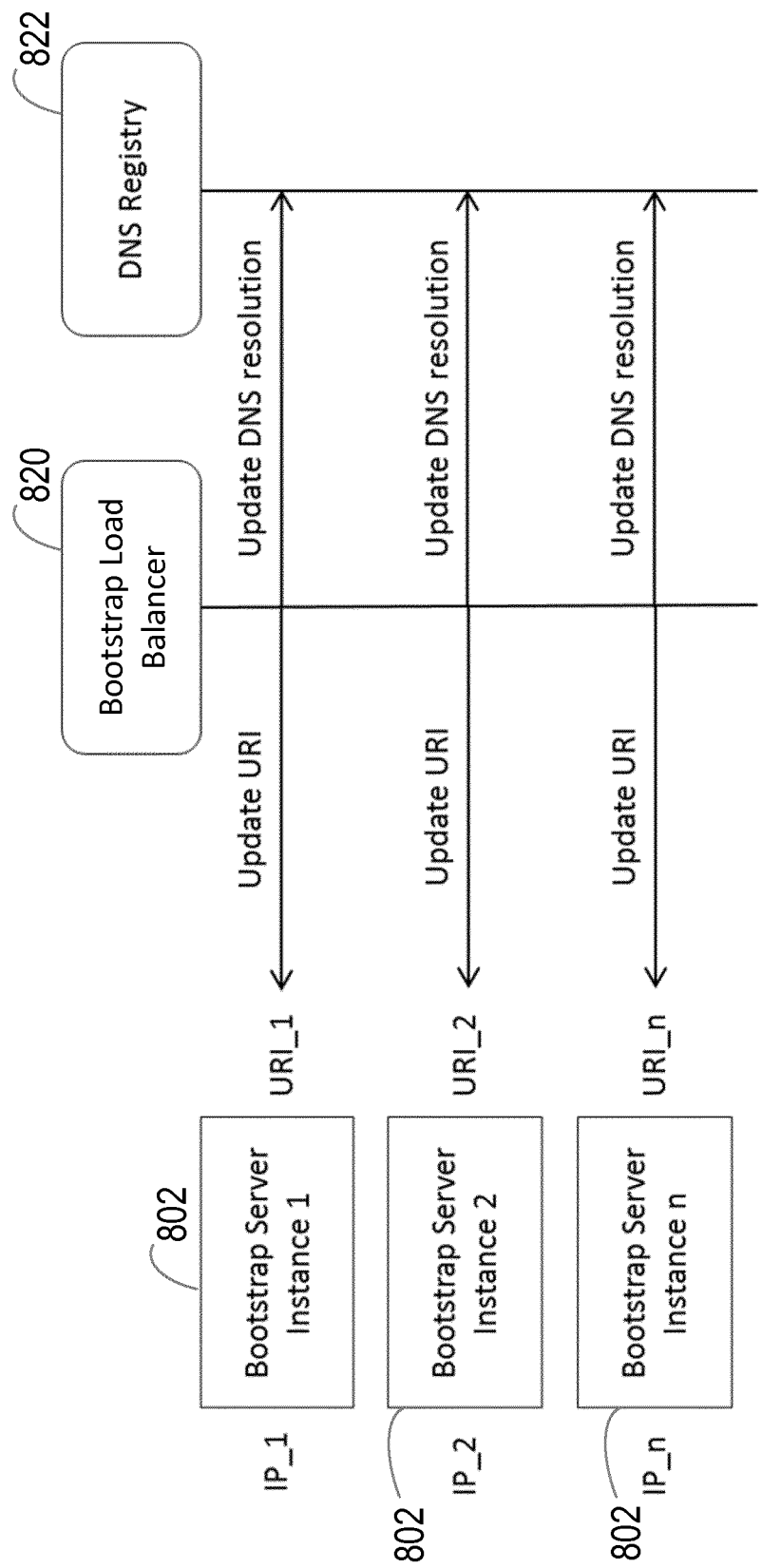
FIG. 8 illustrates an example operation of a bootstrap load balancer.

FIG. 8 illustrates operation of an example bootstrap load balancer 820. The bootstrap load balancer 820 generates a plurality of temporary bootstrap URIs, corresponding to devices operable to connect to the network. The bootstrap load balancer 820 then generates an allocation of temporary bootstrap URIs to bootstrap server instances 802 running on the cloud. The bootstrap load balancer then updates the network DNS registry 822 with mapping between the temporary bootstrap URIs and the IP addresses of the bootstrap server instances 802 in accordance with the generated allocation.

Figure 9:
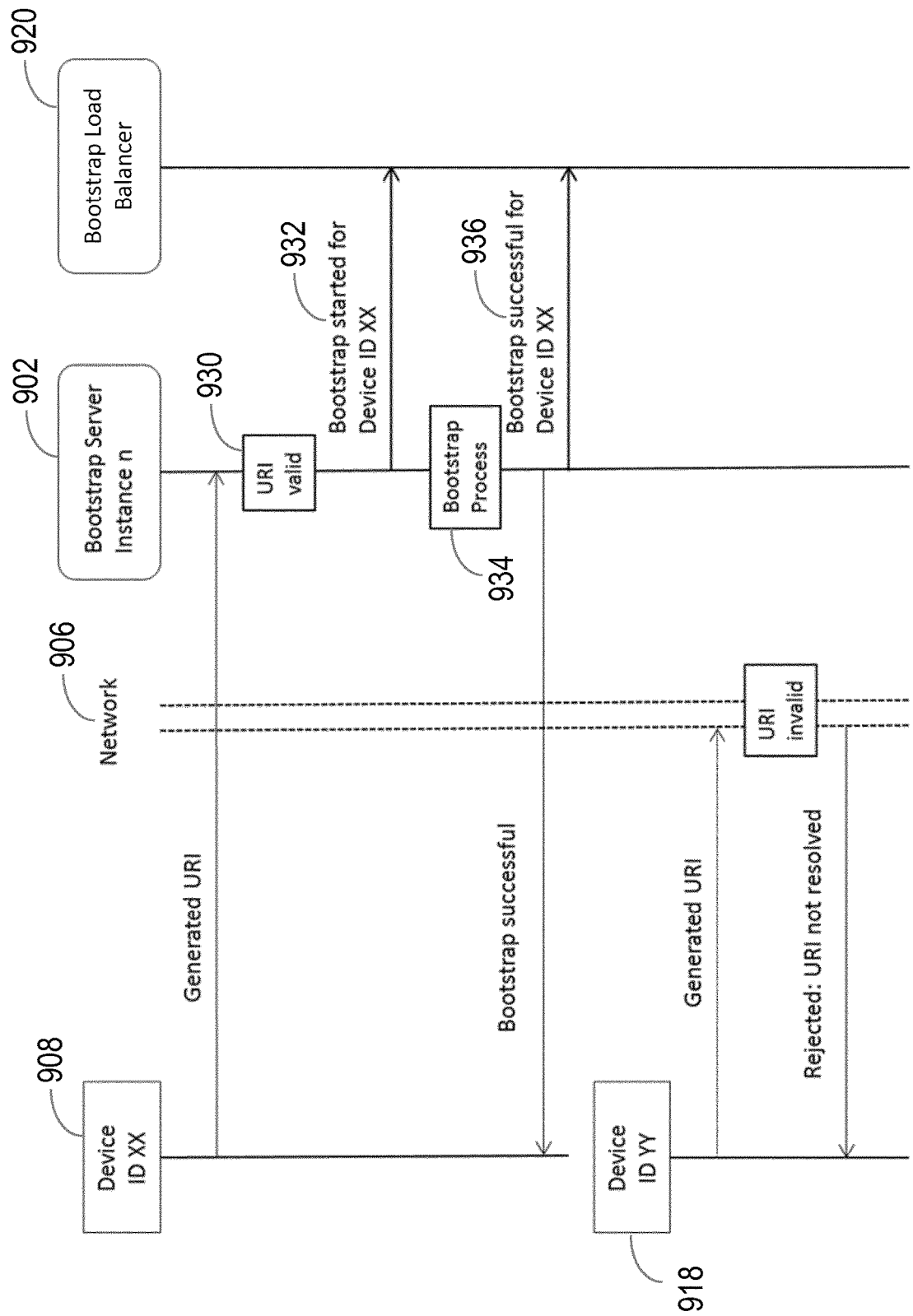
FIG. 9 is a sequence diagram illustrating communication between a device, a bootstrap server instance and a bootstrap load balancer.

FIG. 9 is a message flow diagram illustrating devices 908, 918 seeking to connect to a network. A bootstrap load balancer 920 has performed an example of the method 300, 400 or 500, generating temporary bootstrap URIs corresponding to devices operable to connect to the network 906 and updating a network DNS registry (not shown) with mapping between the temporary bootstrap URIs and the IP addresses of bootstrap server instances running on the cloud. An example bootstrap server instance n 902 is illustrated in the Figure. Device 908 with ID XX seeks to connect to the network and so generates a temporary bootstrap URI and sends a bootstrap request to the generated temporary bootstrap URI. The temporary bootstrap URI is valid and so the bootstrap request is forwarded to bootstrap server instance n 902 via the network thanks to the mapping in the DNS registry. The bootstrap server instance n 902 validates the temporary URI by comparing the temporary URI with device information, and on establishing that the URI is valid, as shown at 930, the bootstrap server instance n 902 sends a notification 932 to the bootstrap load balancer 920. The notification 932 states that bootstrap has commenced for device ID XX. On completion of the bootstrap process at 934, the bootstrap server instance sends a further notification 936 to the bootstrap load balancer. The further notification indicates that bootstrap has been successfully completed for device ID XX. Device 918 with ID YY then seeks to connect to the network and so generates a temporary bootstrap URI and sends a bootstrap request to the generated temporary bootstrap URI. In the illustrated examples, the generated temporary bootstrap URI is invalid and so the request is rejected by the network as there is no mapping in the DNS registry of the invalid URI.

Figure 10:
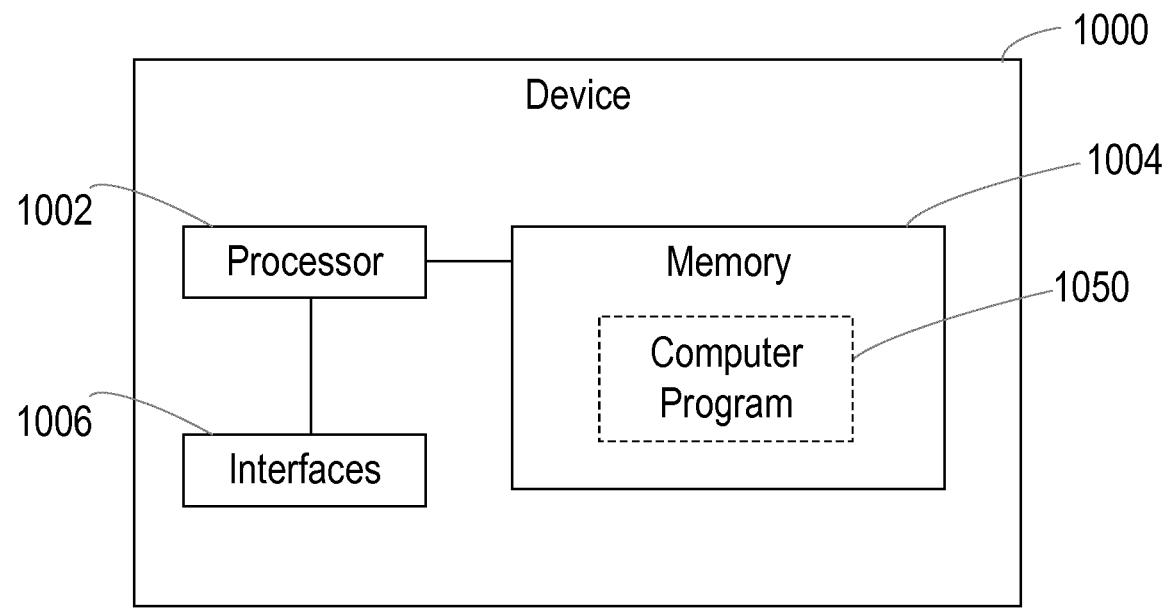
FIG. 10 is a block diagram illustrating functional units in a device.

As discussed above, the methods 100, 200 may be performed by a device, which may in some examples be a constrained device. FIG. 10 is a block diagram illustrating an example device 1000 which may implement the methods 100, 200 according to examples of the present disclosure, for example on receipt of suitable instructions from a computer program 1050. Referring to FIG. 10, the device 1000 comprises a processor or processing circuitry 1002, a memory 1004 and interfaces 1006. The memory 1004 contains instructions executable by the processor 1002 such that the device 1000 is operative to conduct some or all of the steps of the method 100 and/or 200. The instructions may also include instructions for executing one or more telecommunications and/or data communications protocols. The instructions may be stored in the form of the computer program 1050. In some examples, the processor or processing circuitry 1002 may include one or more microprocessors or microcontrollers, as well as other digital hardware, which may include digital signal processors (DSPs), special-purpose digital logic, etc. The processor or processing circuitry 1002 may be implemented by any type of integrated circuit, such as an Application Specific Integrated Circuit (ASIC), Field Programmable Gate Array (FPGA) etc. The memory 1104 may include one or several types of memory suitable for the processor, such as read-only memory (ROM), random-access memory, cache memory, flash memory devices, optical storage devices, solid state disk, hard disk drive etc.

Figure 11:
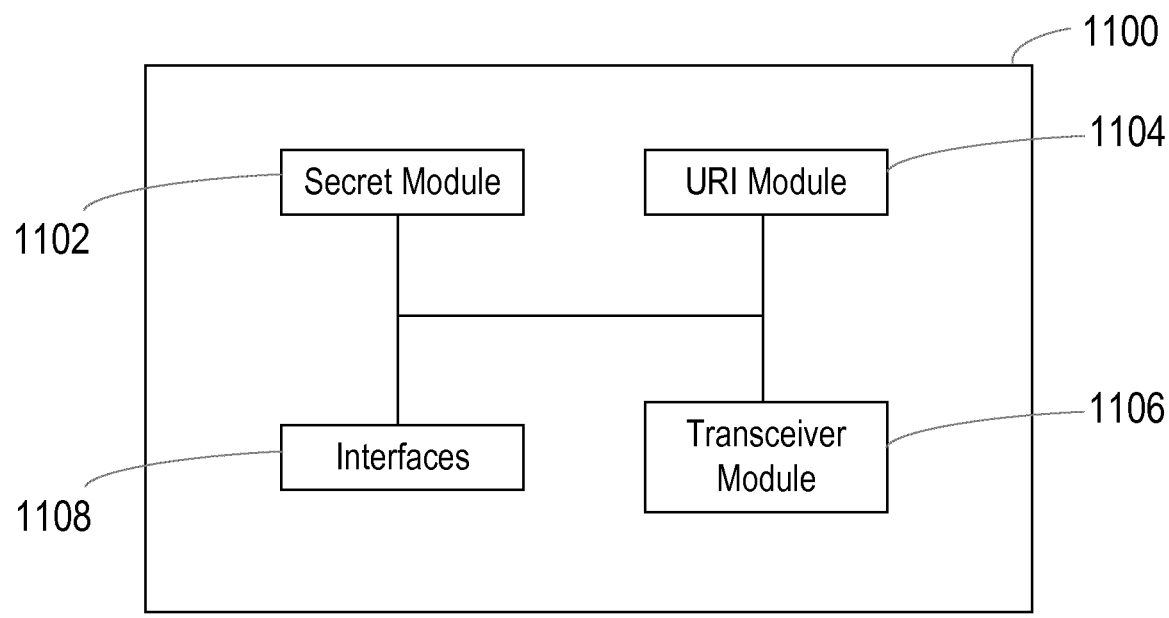
FIG. 11 is a block diagram illustrating functional units in another example of device.

FIG. 11 illustrates functional units in another example of device 1100 which may execute examples of the methods 100, 200 of the present disclosure, for example according to computer readable instructions received from a computer program. It will be understood that the units illustrated in FIG. 11 are functional units, and may be realised in any appropriate combination of hardware and/or software. The units may comprise one or more processors and may be integrated to any degree.

Referring to FIG. 11, the device 1100 comprises a secret module 1102 for computing a derivative of a secret shared with an LWM2M server entity reachable via a network that the device operable to connect to. The device 1100 also comprises a URI module 1104 for generating a temporary bootstrap URI by combining at least a part of the computed derivative with a static bootstrap URI for the network. The device 1100 also comprises a transceiver module 1106 for sending a bootstrap request to the temporary bootstrap URI. The device also comprises interfaces 1108. The term module may have conventional meaning in the field of electronics, electrical devices and/or electronic devices and may include, for example, electrical and/or electronic circuitry, devices, processors, processing circuitry, memories, logic, solid state and/or discrete devices, computer programs or instructions for carrying out respective tasks, procedures, computations, outputs, and/or displaying functions, and so on, as such as those that are described in the present disclosure.

Also as discussed above, the methods 300, 400, 500 may be performed by a bootstrap load balancer. The bootstrap load balancer may be a single element or may be part of a distributed function, which may for example be a Virtualized Network Function.

Figure 12:
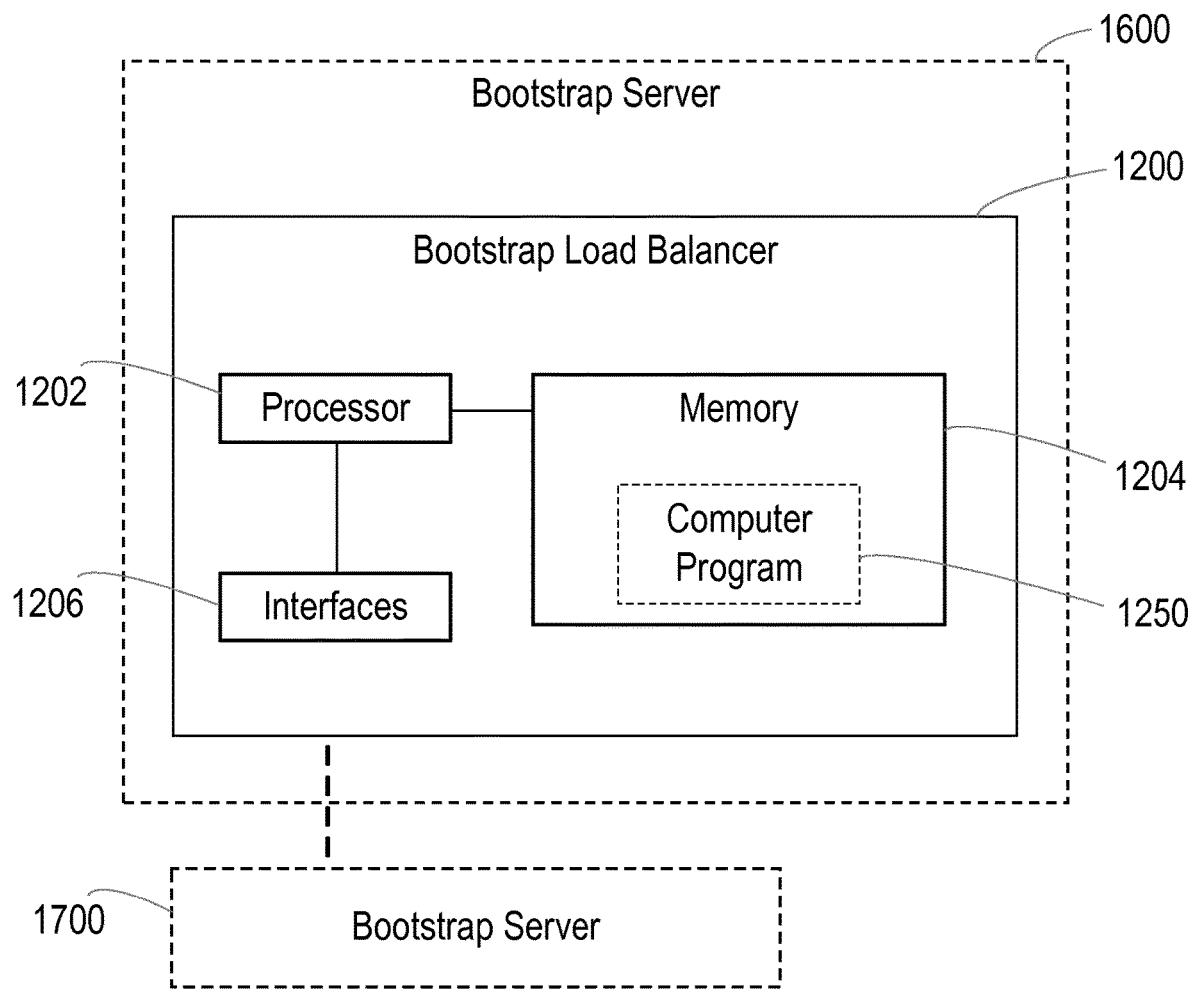
FIG. 12 is a block diagram illustrating functional units in a bootstrap load balancer.

FIG. 12 is a block diagram illustrating an example bootstrap load balancer 1200 which may implement the methods 300, 400, 500 according to examples of the present disclosure, for example on receipt of suitable instructions from a computer program 1250. Referring to FIG. 12, the bootstrap load balancer 1200 comprises a processor or processing circuitry 1202, a memory 1204 and interfaces 1206. The memory 1204 contains instructions executable by the processor 1202 such that the bootstrap load balancer 1200 is operative to conduct some or all of the steps of the method 300, 400 and/or 500. The instructions may also include instructions for executing one or more telecommunications and/or data communications protocols. The instructions may be stored in the form of the computer program 1250. In some examples, the processor or processing circuitry 1202 may include one or more microprocessors or microcontrollers, as well as other digital hardware, which may include digital signal processors (DSPs), special-purpose digital logic, etc. The processor or processing circuitry 1002 may be implemented by any type of integrated circuit, such as an Application Specific Integrated Circuit (ASIC), Field Programmable Gate Array (FPGA) etc. The memory 1204 may include one or several types of memory suitable for the processor, such as read-only memory (ROM), random-access memory, cache memory, flash memory devices, optical storage devices, solid state disk, hard disk drive etc.

As illustrated in FIG. 12, in some examples the bootstrap load balancer 1200 may be a function running within a bootstrap server 1600. In other examples, the bootstrap load balancer 1200 may be run independent of, and in communication with, a bootstrap server 1700.

Figure 13:
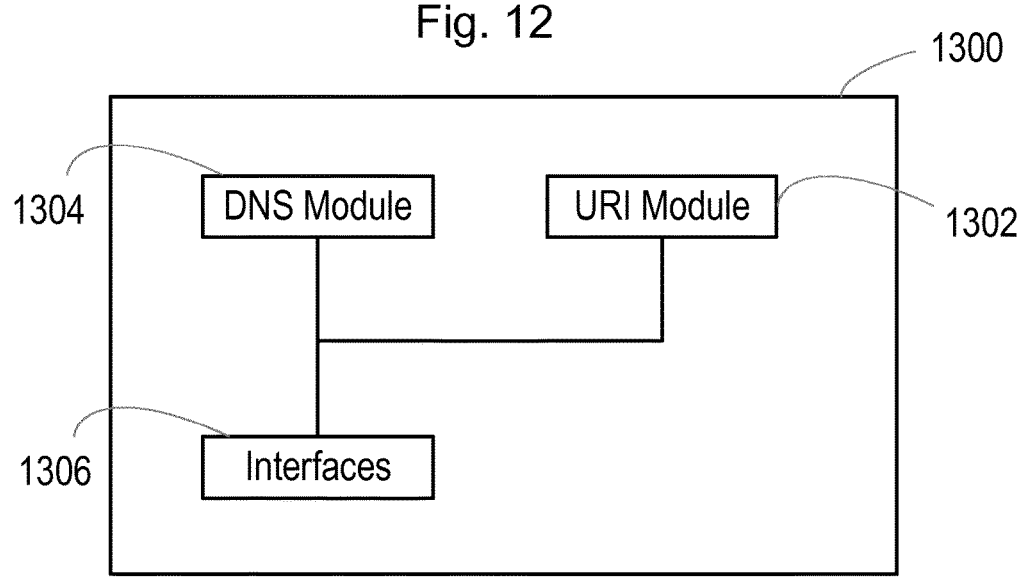
FIG. 13 is a block diagram illustrating functional units in another example of bootstrap load balancer.

FIG. 13 illustrates functional units in another example of bootstrap load balancer 1300 which may execute examples of the methods 300, 400, 500 of the present disclosure, for example according to computer readable instructions received from a computer program. It will be understood that the units illustrated in FIG. 13 are functional units, and may be realised in any appropriate combination of hardware and/or software. The units may comprise one or more processors and may be integrated to any degree.

Referring to FIG. 13, the bootstrap load balancer 1300 comprises a URI module 1302, a DNS module 1304 and interfaces 1306. The URI module 1302 is for obtaining a secret shared between a device operable to connect to a network and an LWM2M entity reachable via the network, computing a derivative of the secret, and generating a temporary bootstrap URI corresponding to the device by combining at least a part of the computed derivative with a static bootstrap URI for the network. The URI module 1302 performs these functions for devices operable to connect to the network. The DNS module 1304 is for updating a network DNS registry to map the generated temporary bootstrap URIs to the IP address of at least one of an LWM2M bootstrap server instance reachable via the network and/or the bootstrap load balancer. The term module may have conventional meaning in the field of electronics, electrical devices and/or electronic devices and may include, for example, electrical and/or electronic circuitry, devices, processors, processing circuitry, memories, logic, solid state and/or discrete devices, computer programs or instructions for carrying out respective tasks, procedures, computations, outputs, and/or displaying functions, and so on, as such as those that are described in the present disclosure.

Also as discussed above, the method 600 may be performed by a bootstrap server. The bootstrap server may be a single element or may be part of a distributed function, which may for example be a Virtualized Network Function.

Figure 14:
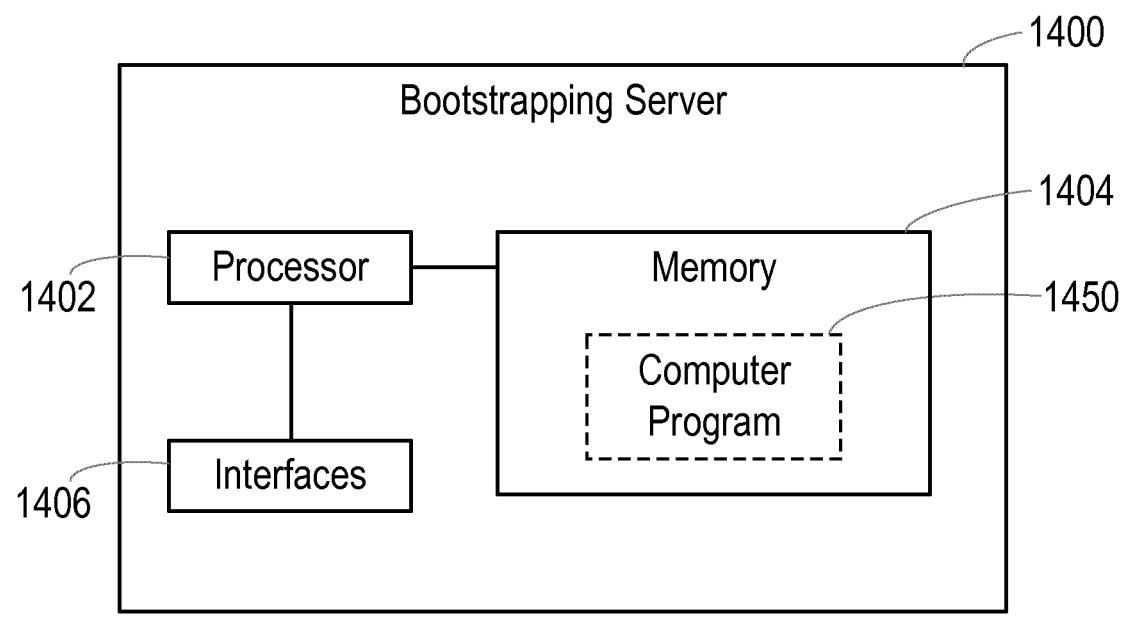
FIG. 14 is a block diagram illustrating functional units in a bootstrap server.

FIG. 14 is a block diagram illustrating an example bootstrap server 1400 which may implement the method 600 according to examples of the present disclosure, for example on receipt of suitable instructions from a computer program 1450. Referring to FIG. 14, the bootstrap server 1400 comprises a processor or processing circuitry 1402, a memory 1404 and interfaces 1406. The memory 1404 contains instructions executable by the processor 1402 such that the bootstrap server 1400 is operative to conduct some or all of the steps of the method 600. The instructions may also include instructions for executing one or more telecommunications and/or data communications protocols. The instructions may be stored in the form of the computer program 1450. In some examples, the processor or processing circuitry 1402 may include one or more microprocessors or microcontrollers, as well as other digital hardware, which may include digital signal processors (DSPs), special-purpose digital logic, etc. The processor or processing circuitry 1002 may be implemented by any type of integrated circuit, such as an Application Specific Integrated Circuit (ASIC), Field Programmable Gate Array (FPGA) etc. The memory 1404 may include one or several types of memory suitable for the processor, such as read-only memory (ROM), random-access memory, cache memory, flash memory devices, optical storage devices, solid state disk, hard disk drive etc.

Figure 15:
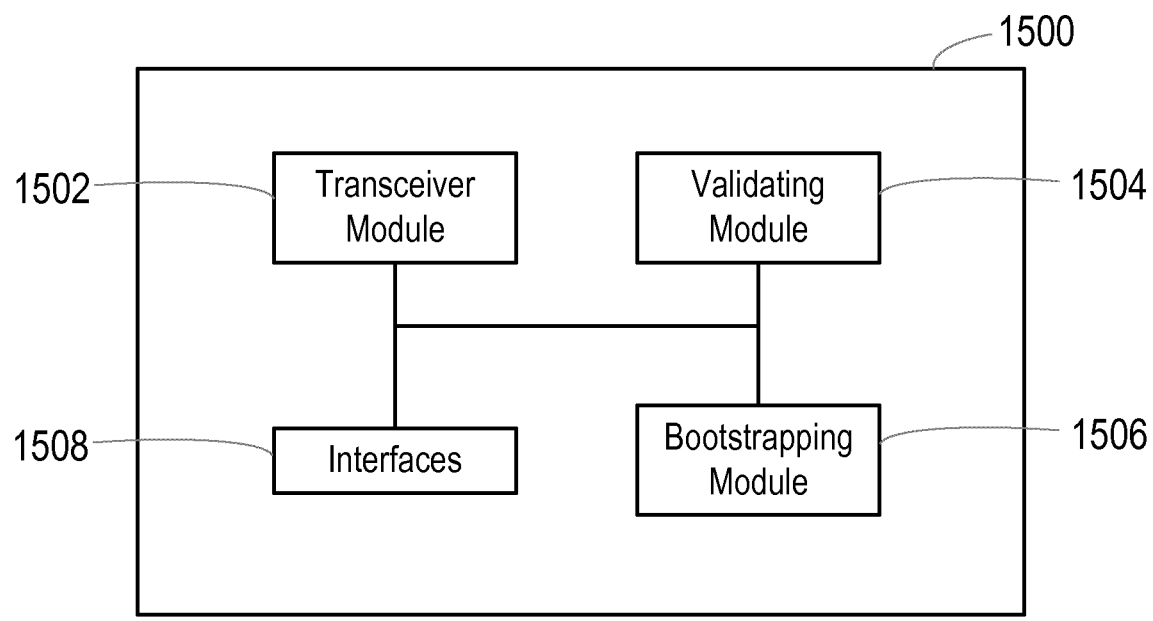
FIG. 15 is a block diagram illustrating functional units in another example of bootstrap server.

FIG. 15 illustrates functional units in another example of bootstrap server 1500 which may execute examples of the method 600 of the present disclosure, for example according to computer readable instructions received from a computer program. It will be understood that the units illustrated in FIG. 15 are functional units, and may be realised in any appropriate combination of hardware and/or software. The units may comprise one or more processors and may be integrated to any degree.

Referring to FIG. 15, the bootstrap server 1500 comprises a transceiver module 1502 for receiving a bootstrap request from a device operable to connect to a network and for sending a notification to a bootstrap load balancer, the notification identifying the device and indicating that bootstrapping of the identified device has commenced. The bootstrap server also comprises a validating module 1504 for validating the device and a bootstrapping module 1506 for commencing a bootstrapping procedure with the device. The term module may have conventional meaning in the field of electronics, electrical devices and/or electronic devices and may include, for example, electrical and/or electronic circuitry, devices, processors, processing circuitry, memories, logic, solid state and/or discrete devices, computer programs or instructions for carrying out respective tasks, procedures, computations, outputs, and/or displaying functions, and so on, as such as those that are described in the present disclosure.

Aspects of the present disclosure provide methods according to which load on a bootstrap server may be balanced by distributing this load between different bootstrap server instances during a device bootstrapping process. Examples of the present disclosure envisage the generation of a temporary bootstrap URI in a device using a secret that is shared between the device and an LWM2M server entity reachable via a network to which the device may connect. The same temporary bootstrap URI is generated by a bootstrap load balancer, and a DNS registry is updated to map the temporary bootstrap URI to the IP address of a bootstrap server instance, which may already be running or which may be generated on demand. Temporary bootstrap URIs, and their mapping to bootstrap server instances, may be updated periodically, providing increased security and permitting dynamic management of load between bootstrap server instances. In addition to avoiding server overload and consequent unresponsiveness at times of heavy activity, examples of the present disclosure provide protection against Denial of Service attacks by distributing load amongst bootstrap server instances. Examples of the present disclosure also decrease the attack surface of a bootstrap server as there is no longer a single point of access to the bootstrap server but multiple temporary bootstrap server URIs which may be periodically updated. The temporary bootstrap URIs are generated using a secret shared between an LWM2M server entity and a device, so providing integrity and authenticity. The logic for generating temporary bootstrap URIs may be shared by devices operable to connect to the network and a bootstrap load balancer, so providing increased security for the bootstrap server.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for operating a device that is operable to connect to a network, the device operable to run a Light Weight Machine to Machine, LWM2M, client and being provisioned with a security credential comprising a secret that is shared with an LWM2M server entity reachable via the network, the method, performed in the device, comprising:
computing a derivative of the secret;
generating a temporary bootstrap Uniform Resource Identifier, URI, by combining at least a part of the computed derivative with a static bootstrap URI for the network (104); and
sending a bootstrap request to the temporary bootstrap URI.

2. A method as claimed in claim 1, further comprising:
receiving a bootstrap response; and
completing a bootstrapping procedure for the network by sending bootstrap messages to the temporary bootstrap URI.

3. A method as claimed in claim 1, wherein computing a derivative of the secret comprises computing a hash function of an input including the secret.

4. A method as claimed in claim 1, wherein computing a derivative of the secret comprises:
generating an input by combining the secret with a parameter; and
computing the derivative of the generated input.

5. A method as claimed in claim 4, wherein combining the secret with a parameter comprises concatenating the secret with the parameter.

6. A method as claimed in claim 1 wherein generating a temporary bootstrap URI further comprises combining a parameter with the at least a part of the computed derivative and static bootstrap URI for the network.

7. A method as claimed in claim 4 wherein the parameter comprises at least one of:
an identifier of the device;
a random variable;
a time stamp.

8. A method as claimed in claim 1, wherein the secret that is shared with an LWM2M server entity reachable via the network comprises a secret that is specific to the device.

9. A method as claimed in claim 1, wherein the secret that is shared with an LWM2M server entity reachable via the network comprises a secret that is common to at least two devices.

10. A device that is operable to connect to a network, the device operable to run a Light Weight Machine to Machine, LWM2M, client and being provisioned with a security credential comprising a secret that is shared with an LWM2M server entity reachable via the network, the device comprising a processor and a memory, the memory containing instructions executable by the processor such that the device is operable to:
compute a derivative of the secret;
generate a temporary bootstrap Uniform Resource Identifier, URI, by combining at least a part of the computed derivative with a static bootstrap URI for the network; and
send a bootstrap request to the temporary bootstrap URI.

* * * * *